United States Patent
Kang et al.

(10) Patent No.: US 11,973,622 B2
(45) Date of Patent: Apr. 30, 2024

(54) ADAPTIVE NON-SPECULATIVE DFE WITH EXTENDED TIME CONSTRAINT FOR PAM-4 RECEIVER

(71) Applicant: LX Semicon Co., Ltd., Daejeon (KR)

(72) Inventors: Jin Ku Kang, Seoul (KR); Do Hyeon Kwon, Incheon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/748,512

(22) Filed: May 19, 2022

(65) Prior Publication Data

US 2022/0376958 A1 Nov. 24, 2022

(30) Foreign Application Priority Data

May 21, 2021 (KR) .................. 10-2021-0065478
May 10, 2022 (KR) .................. 10-2022-0057161

(51) Int. Cl.
*H04L 25/03* (2006.01)

(52) U.S. Cl.
CPC .................. *H04L 25/03057* (2013.01)

(58) Field of Classification Search
CPC ......... H04L 25/03006; H04L 25/03019; H04L 25/03057; H04L 25/03254; H04L 25/03267; H04L 25/03885; H04L 25/4917; H04L 2025/03433; H04L 2025/03535
USPC ......... 375/232, 233, 235, 348–350; 708/322, 708/323
See application file for complete search history.

(56) References Cited

U.S. PATENT DOCUMENTS

| | | | |
|---|---|---|---|
| 10,728,059 B1* | 7/2020 | Sun | H04L 25/03057 |
| 10,892,791 B2 | 1/2021 | Hossain et al. | |
| 2010/0046683 A1* | 2/2010 | Beukema | H04L 7/0062 |
| | | | 375/355 |
| 2016/0080178 A1* | 3/2016 | Chen | H03L 7/089 |
| | | | 375/233 |

FOREIGN PATENT DOCUMENTS

| KR | 102204355 B1 | 1/2021 |
|---|---|---|
| KR | 102367086 A | 2/2022 |

OTHER PUBLICATIONS

Journal of Semiconductor Technology and Science, vol. 21, No. 2, Apr. 2021 "Adaptive Non-speculative DFE with Extended Time Constraint for PAM-4 Receiver".

* cited by examiner

*Primary Examiner* — Young T. Tse
(74) *Attorney, Agent, or Firm* — POLSINELLI PC

(57) ABSTRACT

The present disclosure proposes an adaptive non-speculative DFE with an extended time constraint for a PAM-4 receiver and a method for operating the same. An adaptive non-speculative DFE with an extended time constraint for a PAM-4 receiver according to the present disclosure comprises a Continuous-Time Linear Equalizer (CTLE) to boost high-frequency components of an input signal, a Track and Hold (T&H) circuit to track and hold an output of the CTLE, and a sampler, wherein the sampler includes a Decision Feedback Equalization (DFE) sampler to equalize an output of the T&H circuit and sample an output of the T&H circuit in a DFE sampling clock phase; and a DATA sampler to sample a signal equalized by the DFE sampler in a DATA sampling clock phase, wherein the DFE sampling clock phase differs from the DATA sampling clock phase.

19 Claims, 20 Drawing Sheets

ADAPTIVE NON-SPECULATIVE DFE WITH EXTENDED TIME CONSTRAINT FOR PAM-4 RECEIVER

CROSS REFERENCE TO RELATED APPLICATION

This application claims priority from Republic of Korea Patent Applications Nos. 10-2021-0065478 filed on May 21, 2021 and 10-2022-0057161 filed on May 10, 2022, which are hereby incorporated by reference for all purposes as if fully set forth herein.

BACKGROUND

1. Field of Technology

The present disclosure relates to an adaptive non-speculative Decision Feedback Equalizer (DFE) with an extended time constraint for a PAM-4 receiver.

2. Description of the Prior Art

Along with the wide use of 5G mobile communication technology and the application of deep learning technology to autonomous driving and visual recognition, the demand for data transmission and reception at high data rates is increasing. As the data rate increases, channel attenuation becomes more significant, and the resultant Inter Symbol Interference (ISI) adversely influences the NRZ signal. Therefore, PAM-4 signaling capable of transmitting data at twice the data rate is more efficient than NRZ signaling [2][4] due to its higher bandwidth efficiency.

A reception error occurs in the data received through a transmission line due to the difference in attenuation between low- and high-frequency components. There are several equalization techniques to ensure signal integrity. Continuous-Time Linear Equalizer (CTLE) features low power consumption, simple implementation, and effective canceling of both pre-cursor and post-cursor ISI. However, frequency bandwidth is limited due to parasitic poles, and the signal and noise increase by the same amount. Therefore, to improve the signal-to-noise ratio (SNR) performance, only the ISI is selectively removed using a Decision Feedback Equalizer (DFE) [1][2]. A DFE requires data sampling and filter coefficient calculation before the next sample, and timing constraints are highly stringent on the DFE at a high data rate. If the timing constraints are not met, the first tap becomes unavailable, and the ISI may not be canceled efficiently. There are two types of DFEs: direct DFE and speculative DFE [6]. A direct DFE removes the ISI appearing in the next sample based on preceding samples. The direct DFE structure uses the least number samplers but has the strictest timing constraints. Various direct DFEs have been proposed to reduce a feedback delay, and the same timing constraint still applies [1][2][7]. A speculative DFE selects the most reliable data among the data judged for all cases [9]. Since no feedback path is applied to satisfy a given timing constraint, an excessive number of samplers and multiplexers are used, particularly for PAM4 signaling. Therefore, there is a need for a method for extending the time constraint on the DFE to replace the hardware consuming speculative DFE approach for PAM-4 signaling.

SUMMARY OF THE INVENTION

A technical object of the present disclosure is to propose a novel approach to extend the time constraint of a DFE through an adaptive non-speculative DFE with an extended time constraint for a PAM-4 receiver.

In one aspect, an adaptive non-speculative DFE with an extended time constraint for a PAM-4 receiver according to the present disclosure comprises a Continuous-Time Linear Equalizer (CTLE) to boost high-frequency components of an input signal; a Track and Hold (T&H) circuit to track and hold the output of the CTLE; and a sampler, where the sampler includes a Decision Feedback Equalization (DFE) sampler equalizing the output of the T&H circuit and sampling the output of the T&H circuit in a DFE sampling clock phase and a DATA sampler sampling a signal equalized by the DFE sampler in a DATA sampling clock phase, where the DFE sampling clock phase differs from the DATA sampling clock phase.

The T&H circuit tracks the output of the CTLE for 2 Unit Interval (UI) on the falling edge of a clock and holds the output of the CTLE for 2 UI on the rising edge of the clock.

The output of the DFE sampler sampling the output of the T&H circuit in the DFE sampling clock phase is used as a tap coefficient for equalizing the output voltage of a summer to converge, and the output of the DATA sampler sampling the output of the T&H circuit in the DATA sampling clock phase is encoded and used as data to increase timing margin.

Since the DFE sampling clock phase is different from the DATA sampling clock phase, settling time of the DATA sampler has a larger margin than the settling time of the DFE sampler, and when an error occurs at the output of the DFE sampler, tap coefficients are adjusted using the output of the DATA sampler which provides a larger margin for the settling time.

The DFE further includes a summer between the T&H circuit and the sampler, where the summer keeps the common voltage of a signal constant regardless of weights through directional equalization using a Low Voltage Differential Signaling (LVDS) tap.

In another one aspect, a method for operating an adaptive non-speculative DFE with an extended time constraint for a PAM-4 receiver according to the present disclosure comprises boosting high-frequency components of an input signal through a Continuous-Time Linear Equalizer (CTLE); tracking and holding the output of the CTLE through a Track & Hold (T&H) circuit; equalizing the output of the T&H circuit and sampling the output of the T&H circuit in a DFE sampling clock phase through a Decision Feedback Equalization (DFE) sampler of a sampler; and sampling a signal equalized by the DFE sampler in a DATA sampling clock phase through a DATA sampler of the sampler.

An adaptive non-speculative DFE with an extended time constraint for a PAM-4 receiver according to embodiments of the present disclosure may extend the time constraint of 1 Unit Interval (UI) in direct DFE to 1.5 UI by sampling signals of the same level at two points using track and hold operation. The FIR-tap employs the LVDS structure to maintain common voltage, the SS-LMS algorithm is used to obtain the optimal tap weight, the first post-cursor ISI cancellation is performed based on the LVDS tap, and the proposed DFE provides a sufficient settling time. The proposed structure may eliminate a loop that performs a speculative DFE for PAM-4 signaling, thereby reducing the hardware for implementing a PAM-4 DFE.

DETAILED DESCRIPTION OF THE EXEMPLARY EMBODIMENTS

The present disclosure proposes a new approach for solving a time constraint problem with a DFE using PAM-4 signaling. According to an embodiment of the present disclosure, the time constraint of 1 Unit Interval (UI) in direct DFE may be extended up to 1.5 UI by sampling signals of the same level at two points using a track and hold operation. The FIR-tap employs the LVDS structure to maintain common voltage, the SS-LMS algorithm is used to obtain the optimal tap weight. The first post-cursor ISI cancellation is performed based on the LVDS tap, and the proposed DFE provides a sufficient settling time. The proposed structure may eliminate a loop that performs a speculative DFE for PAM-4, which leads to reduction of the hardware for implementing a PAM-4 DFE. A PAM-4 serial link using the proposed DFE is designed based on the 65 nm CMOS technology and analyzed. Channels with 11.9 dB and 13.8 dB losses are compensated through CTLE and the proposed 1-tap DFE, and simulation results show that the time constraint may be extended without deterioration of eye opening. In what follows, an embodiment of the present disclosure will be described in detail with reference to appended drawings.

Figures 1A, 1B:
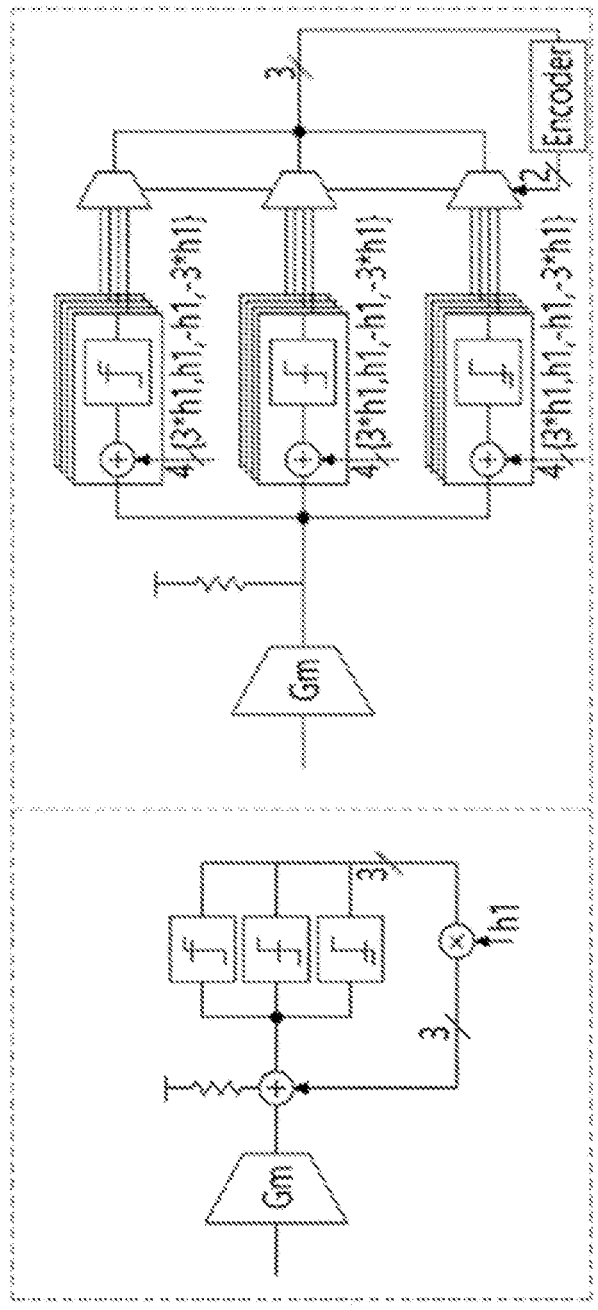
FIGS. 1A and 1B illustrate a direct DFE structure and a speculative DFE structure according to the prior art.

FIGS. 1A and 1B illustrate a direct DFE structure and a speculative DFE structure according to the prior art.

FIG. 1A shows a one-tap direct Decision Feedback Equalizer (DFE), and FIG. 1B shows a one-tap speculative Decision Feedback Equalizer (DFE) on a PAM-4 full data rate case. In the direct DFE structure, the time constraint of the critical path is given as follows.

$$T_{clk\text{-}q}+T_{prop\text{-}vtoi}+T_{sum\text{-}settle}<1\ \text{UI} \tag{1}$$

In Eq. (1), $T_{clk\text{-}q}$ represents the clock-to-q delay of a sampler, $T_{prop\text{-}vtoi}$ represents the propagation delay from a change in the digitized hi value to a change in the current of a summer, and $T_{sum\text{-}settle}$ represents the settling time of the output voltage of the summer corresponding to the current change in the summer. A speculative structure may be used as a method for relieving the time constraint in the direct DFE. The speculative structure does not require the settling time because ISI is not removed from the output node of the summer. However, the output node of the summer has to drive four times as many samplers as the direct DFE. In other words, when a multiplexer and an encoder are involved, the speculative DFE requires four times more hardware components than the direct DFE. Moreover, a loop created by the multiplexers to select a reliable value diminishes the advantage of the speculative structure [2]. In the speculative DFE architecture, the time constraint of the critical path is given as follows:

$$T_{clk\text{-}q}+T_{prop\text{-}mux}<1\ \text{UI} \tag{2}$$

In Eq. (2), $T_{prop\text{-}mux}$ represents a mux propagation delay. Since there is no feedback equalization action through the summer, $T_{prop\text{-}vtoi}$ and $T_{sum\text{-}settle}$ are removed, and only $T_{prop\text{-}mux}$ is added. Therefore, it is easier for the speculative DFE to satisfy the time constraint than the direct structure.

Figure 2:
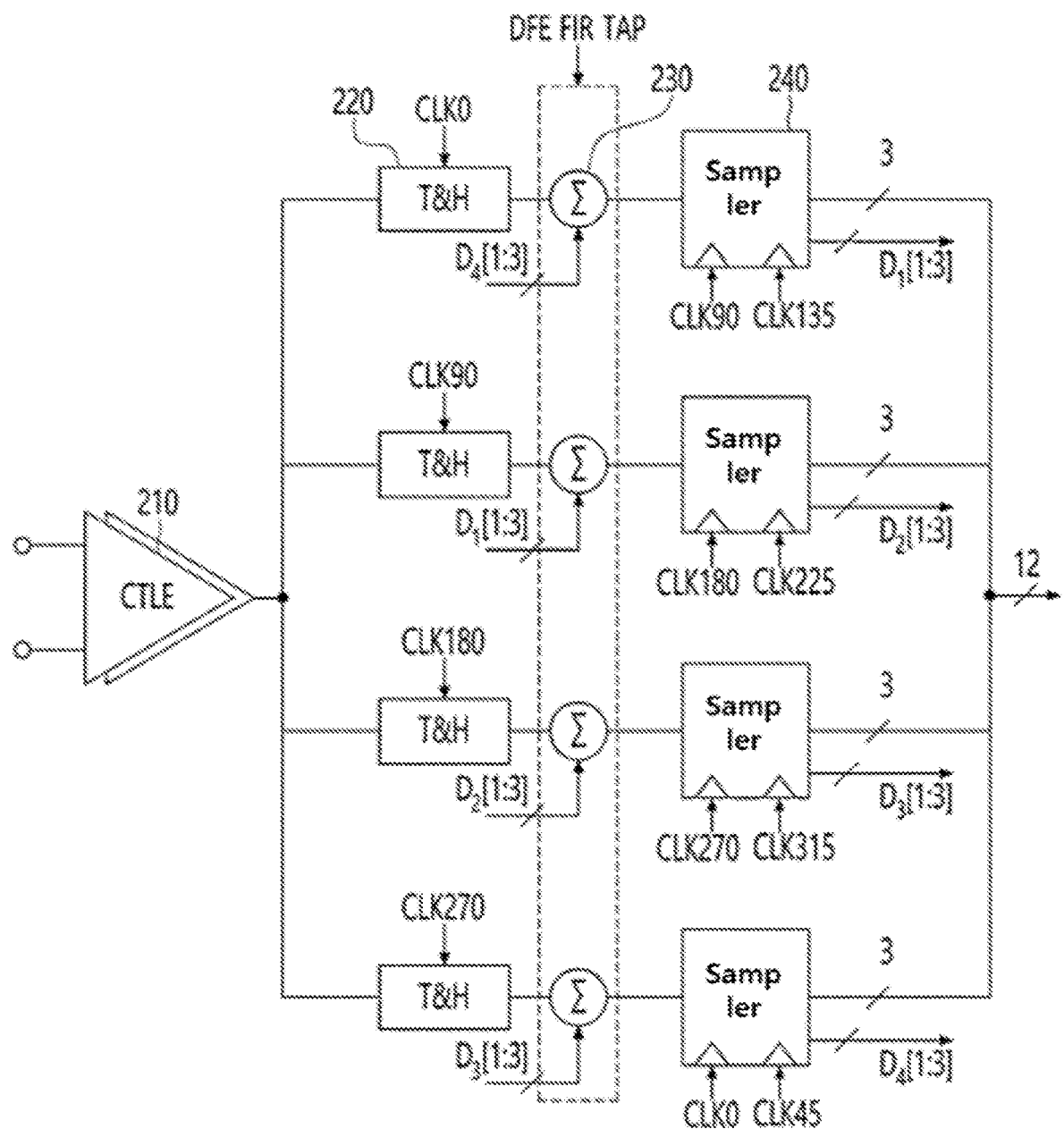
FIG. 2 illustrates an adaptive non-speculative DFE with an extended time constraint for a PAM-4 receiver according to one embodiment of the present disclosure.

FIG. 2 illustrates an adaptive non-speculative DFE with an extended time constraint for a PAM-4 receiver according to one embodiment of the present disclosure.

The embodiment of the present disclosure proposes an adaptive non-speculative DFE structure with a 1.5 Unit Interval (UI) timing constraint. The proposed approach minimizes additional hardware while overcoming the drawbacks of the direct DFE and the speculative DFE. FIG. 2 shows a block diagram of the proposed DFE for quarter-rate PAM-4 signaling. Compared to the conventional DFE structures, a sampler (refer to FIG. 3) including a DFE sampler and a DATA sampler is used. FIG. 4 illustrates a summer having an LVDS tap according to an embodiment of the present disclosure.

An adaptive non-speculative DFE with an extended time constraint for a PAM-4 receiver according to one embodiment of the present disclosure includes a Continuous-Time Linear Equalizer (CTLE) 210, a Track and Hold (T&H) circuit 220, a summer 230, and a sampler 240.

First, the CTLE 210 boosts high-frequency components of an input signal.

The T&H circuit 220 tracks and holds the output of the CTLE 210.

The output of CTLE 210 needs to be tracked and held, and the embodiment of the present disclosure adopts the bootstrap structure of the Track and Hold (T&H) circuit 220 [1][8]. The T&H circuit 220 tracks the output of CTLE 210 for 2 Unit Interval (UI) on the falling edge of the clock and holds the output of CTLE 210 for 2 UI on the rising edge of the clock.

The summer 230 between the T&H circuit 220 and the sampler 240 keeps the common voltage of a signal constant regardless of weights through directional equalization using a Low Voltage Differential Signaling (LVDS) tap.

Figure 3:
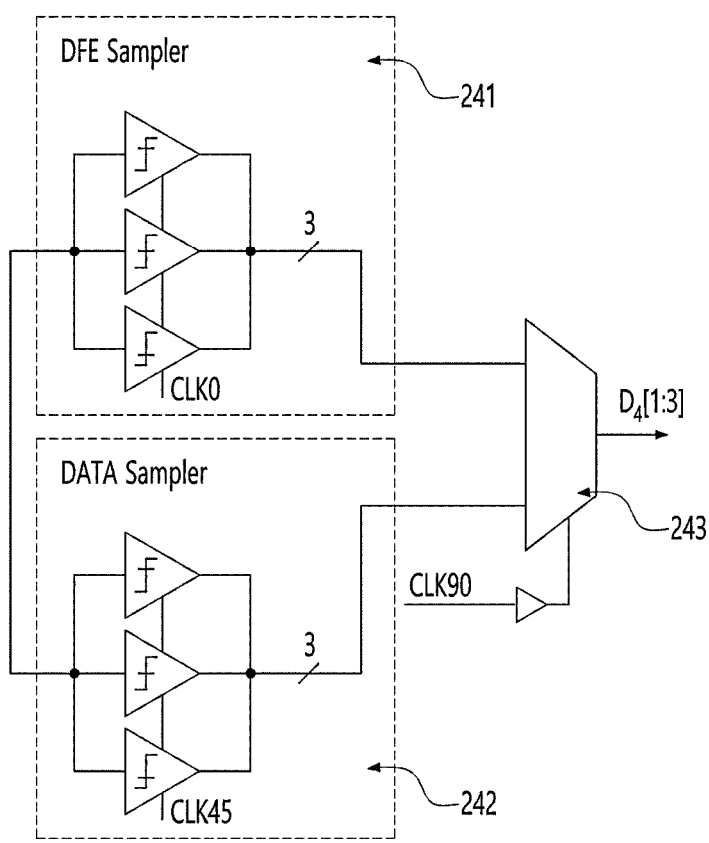
FIG. 3 illustrates a structure of a sampler according to one embodiment of the present disclosure.
Figure 4:
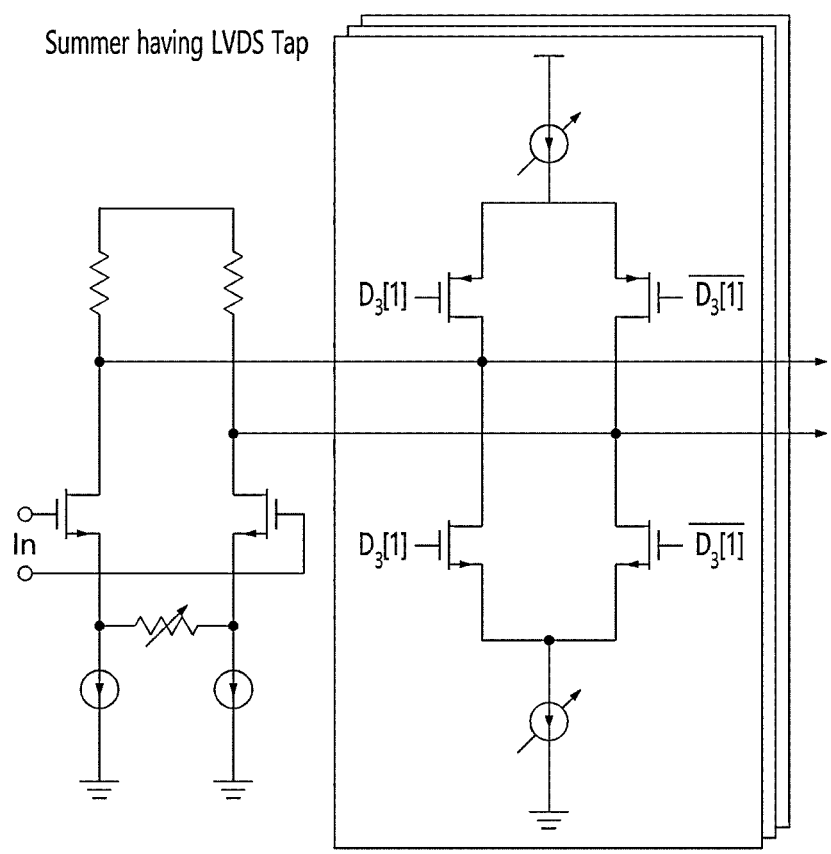
FIG. 4 illustrates a structure of a summer according to one embodiment of the present disclosure.

The sampler 240 includes a Decision Feedback Equalization (DFE) sampler and a DATA sampler (refer to FIG. 3).

The DFE sampler equalizes the output of the T&H circuit 220 and samples the output of the T&H circuit in the DFE sampling clock phase.

The DATA sampler samples a signal equalized by the DFE sampler in the DATA sampling clock phase. Here, the DFE sampling clock phase differs from the DATA sampling clock phase.

The output of the T&H circuit is equalized once again in the DFE sampling clock phase by the DFE sampler and then sampled by the DATA sampler in the DFE sampling clock phase different from the DFE sampling clock phase. In the direct DFE structure, only the output of the data sampler is used as a tap coefficient, and the output is encoded and used as recovered data. On the other hand, the roles of the DFE sampler and the DATA sampler in the proposed approach are different from the direct DFE structure as described below. The output of the DFE sampler that samples the output of the T&H circuit in the DFE sampling clock phase is encoded and used as a tap coefficient to equalize the output voltage of the summer to converge. Also, the output of the DATA sampler that samples the output of the T&H circuit in the DATA sampling clock phase is encoded and used as data, which increases the timing margin. Since the phase of the DFE sampling clock is different from the phase of the DATA sampling clock, the settling time of the DATA sampler may have a larger margin than the settling time of the DFE sampler. Also, when an error occurs in the output of the DFE sampler, the tap coefficient may be adjusted using the output of the DATA sampler having a larger margin for the settling time. A detailed timing diagram of the sampler 240 according to an embodiment of the present disclosure is shown in FIG. 3.

Figure 5:
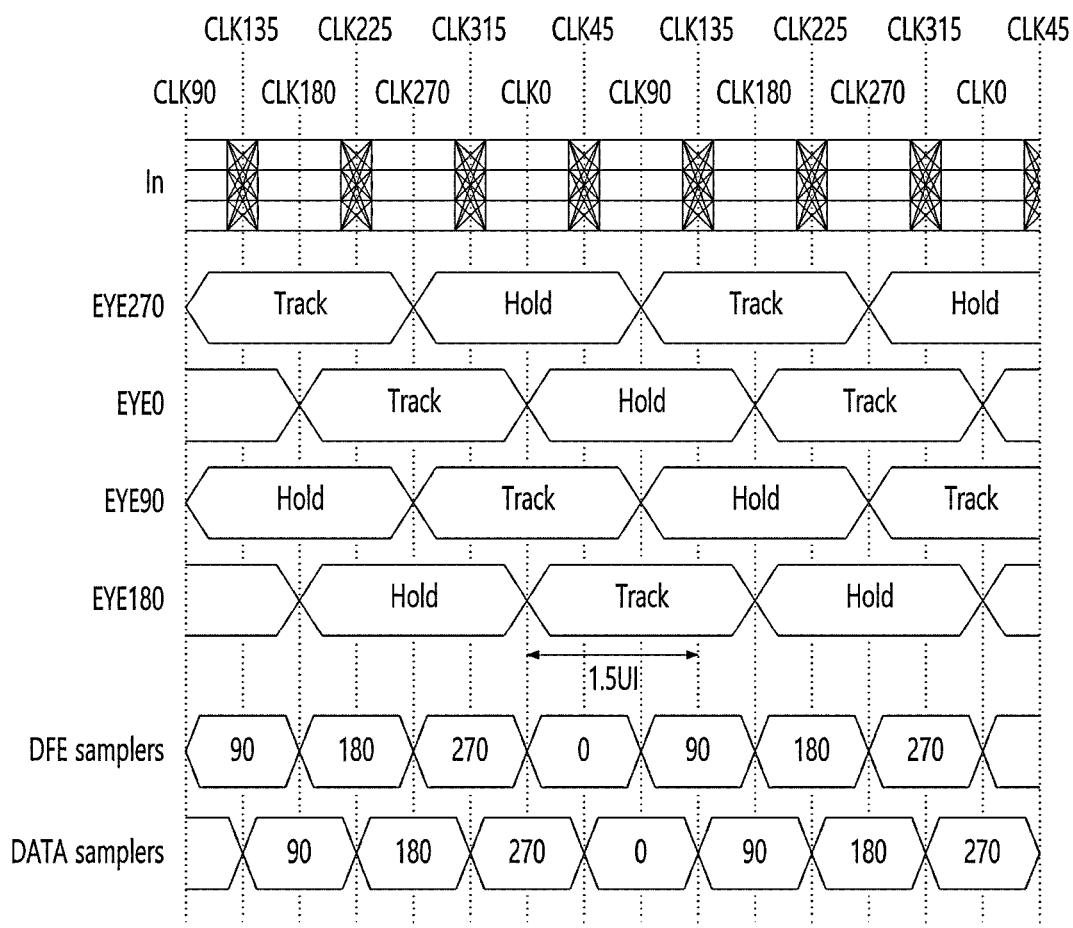
FIG. 5 illustrates a timing diagram of a sampler according to one embodiment of the present disclosure.

FIG. 5 illustrates a timing diagram of a sampler according to one embodiment of the present disclosure.

One T&H circuit tracks the input signal for 2UI from the falling edge of CLK270 and holds the input signal for 2UI from the rising edge of CLK270. The output of the T&H circuit is shown in EYE270 of FIG. 5. EYE270 is sampled by the DFE sampler on the rising edge of CLK0 and sampled by the DATA sampler on the rising edge of CLK45, respectively. By sampling EYE270 at CLK0, the output of the DFE sampler is used as the tap coefficient for equalizing EYE0.

The equalized EYE0 is sampled through the DATA sampler at the CLK135 and used as recovered data.

Since EYE0 is equalized by the output of the DFE sampler sampled at CLK0, it has a timing margin of 1.5 UI from CLK0 to CLK135 for equalization. Therefore, the 1 UI time constraint of a direct DFE may be extended to 1.5 UI by separating the roles performed by one sampler using the DFE sampler and the DATA sampler having different sampling timings according to an embodiment of the present disclosure. Equation (3) represents the timing constraint of a critical path from the DFE sampler to the DATA sampler, and Equation (4) represents the timing constraint of a critical path between two DFE samplers.

$$T_{clk\text{-}q}+T_{prop\text{-}vtoi}+T_{sum\text{-}settle}<1.5 \text{ UI} \quad (3)$$

$$T_{clk\text{-}q}+T_{prop\text{-}vtoi}<1 \text{ UI} \quad (4)$$

To properly converge the output voltage of the summer, the tap coefficient has to be completed within 0.5 UI [3]. Considering the case where equalization for each tap has a sufficient settling time, the timing margin except for the settling time is 0.5 UI for the direct DFE and 1 UI for the proposed DFE. Therefore, the proposed DFE structure may handle data at twice the data rate with a sufficient settling time.

Figure 6:
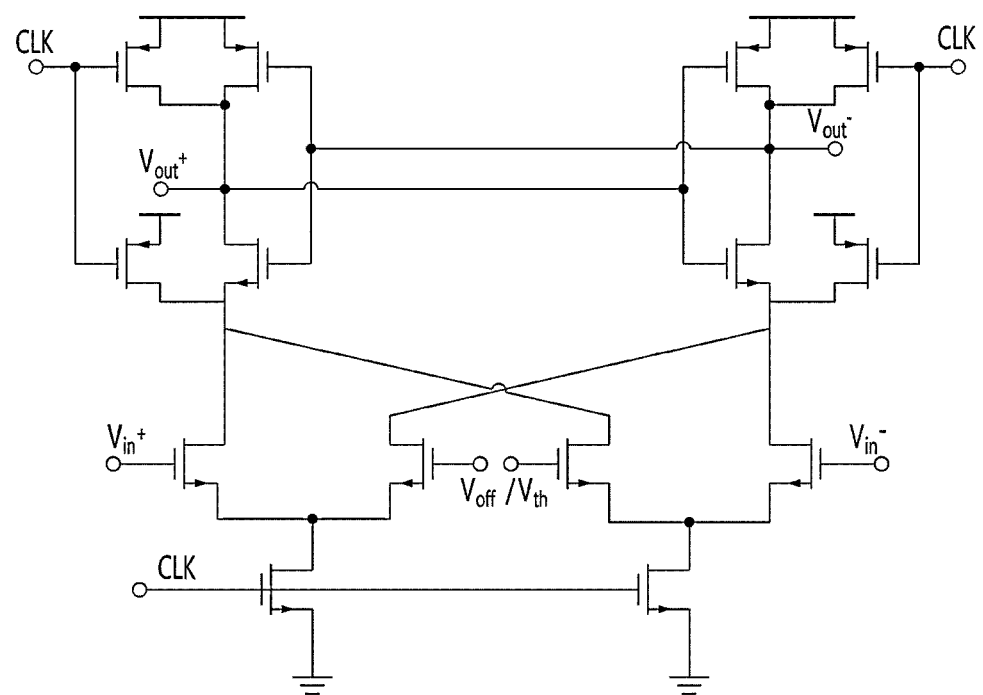
FIG. 6 illustrates a strong arm-type latch used for obtaining a feedback delay according to one embodiment of the present disclosure.

FIG. 6 illustrates a strong arm-type latch used for obtaining a feedback delay according to one embodiment of the present disclosure.

Figure 7:
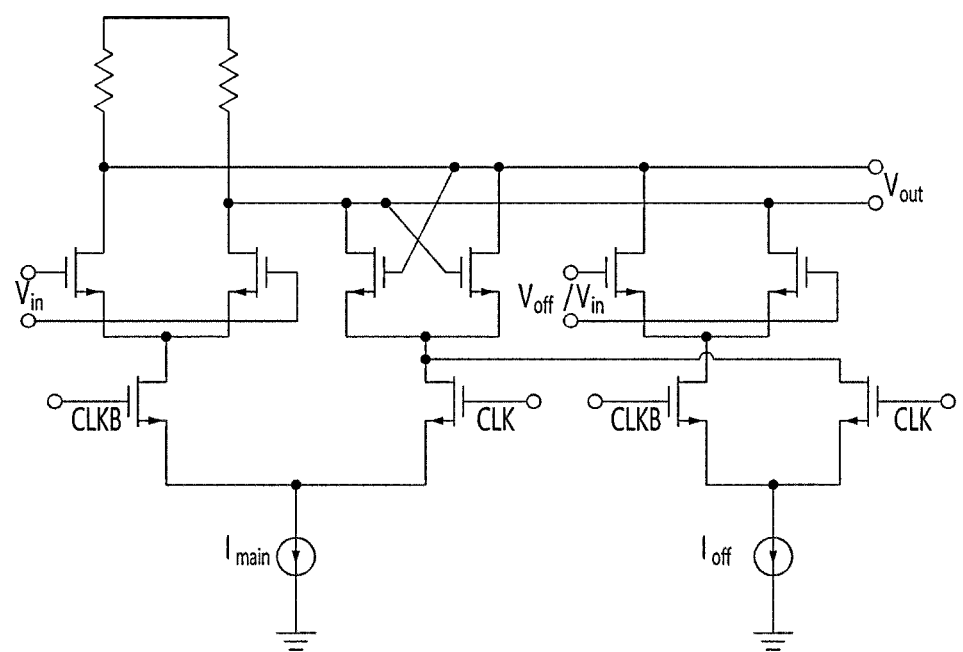
FIG. 7 illustrates a CML latch used for obtaining a feedback delay according to one embodiment of the present disclosure.

FIG. 7 illustrates a CML latch used for obtaining a feedback delay according to one embodiment of the present disclosure.

Tables 1 and 2 show the values obtained by simulating feedback delays at various data rates using a 65 nm CMOS process when strong arm-type latches and Current Mode Logic (CML)-type latches are used, respectively.

FIGS. 6 and 7 show the strong arm-type latch and CML-type latch used to obtain the feedback delay [6] [11].

TABLE 1

| | Data rate | | | | | |
|---|---|---|---|---|---|---|
| | 5 Gb/s | | 7.5 Gb/s | | 10 Gb/s | |
| DFE structure | Direct | Proposed | Direct | Proposed | Direct | Proposed |
| Time constraint | 1 | 1.5 | 1 | 1.5 | 1 | 1.5 |
| $T_{sum\text{-}settle}$ | 0.5 | 0.5 | 0.5 | 0.5 | 0.5 | 0.5 |
| Feedback delay ($T_{clk\text{-}q}$ + $T_{prop\cdot vtoi}$) | 0.475 | 0.475 | 0.66 | 0.66 | 0.95 | 0.95 |
| Delay margin | 0.025 | 0.525 | −0.16 | 0.34 | −0.475 | 0.025 |

TABLE 2

| | Data rate | | | | | |
|---|---|---|---|---|---|---|
| | 15 Gb/s | | 22.5 Gb/s | | 30 Gb/s | |
| DFE structure | Direct | Proposed | Direct | Proposed | Direct | Proposed |
| Time constraint | 1 | 1.5 | 1 | 1.5 | 1 | 1.5 |
| $T_{sum\text{-}settle}$ | 0.5 | 0.5 | 0.5 | 0.5 | 0.5 | 0.5 |
| Feedback delay ($T_{clk\text{-}q}$ + $T_{prop\cdot vtoi}$) | 0.45 | 0.45 | 0.68 | 0.68 | 0.91 | 0.91 |
| Delay margin | 0.05 | 0.55 | −0.18 | 0.32 | −0.41 | 0.09 |

Table 1 shows that delay margin of the proposed DFE structure for 10 Gb/s input data is the same as that of 5 Gb/s in the direct DFE structure. When the strong arm-type latch is used, the direct DFE provides a settling time sufficient for up to the data rate of 5 Gb/s, while the proposed DFE structure may provide a settling time sufficient for up to 10 Gb/s data rate. As shown in Table 2, when the CML-type latch is used, the input data rate with a sufficient settling time rises from 15 Gb/s to 30 Gb/s. In the case of 7.5 Gb/s input data in Table 1, the 1 UI time constraint has a negative delay margin of −0.16 UI. In other words, when the first tap with a direct DFE structure is implemented, the first tap is given a tap coefficient based on the preceding data but always has an insufficient settling time. Signals equalized by an insufficient settling time have a relatively high probability of incorrect sampling output. This not only causes a bit error but also leads to an erroneous tap coefficient. In the case of the proposed 1.5 UI structure, the delay margin is 0.34 UI, which is sufficient for the settling time. In other words, the DATA sampler with a sufficient settling time samples the signal equalized by the output of the DFE sampler. The DFE sampler has a time constraint of 1 UI, which thus provides an insufficient settling time. Even if an error occurs in the output of the DFE sampler due to the insufficient sampling time, since the DATA sampler has a sufficient settling time, a bit error does not occur. However, a problem occurs in the tap coefficient for the next sample. The output of the DATA sampler is more reliable than that of the DFE sampler. This is because the DATA sampler has a sufficient settling time. Therefore, if an error occurs at the output of the DFE sampler, it is desirable to adjust the tap coefficient through the output of the DATA sampler. When the DFE sampler and the DATA sampler have the same value, the tap coefficient has a correct value in advance by 0.5 UI. When the DFE sampler and the DATA sampler have different outputs, namely, when the output of the DFE sampler has an error, the tap coefficient always has a correct value since the DATA sampler modifies the tap coefficient. In other words, at 7.5 Gb/s signaling, the direct DFE structure generates a bit error and generates a tap coefficient error when the sampler output goes wrong. However, in the case of the proposed DFE structure, a bit error does not occur because the DATA sampler has a sufficient settling time. Also, since the tap coefficient is modified by the output of the DATA sampler when an error occurs in the output of the DFE sampler, the tap coefficient has always a correct value. Likewise, as shown in Table 2, in the case of CML-type latch for 22.5 Gb/s signaling, the direct DFE has an insufficient settling time with a delay margin of −0.18 UI, while the proposed DFE may implement the first tap with a sufficient settling time with a delay margin of 0.32 UI.

TABLE 3

| DFE structure | Direct DFE | Speculative DFE | Proposed DFE |
|---|---|---|---|
| Data sampler | 3 | 12 | 3 |
| DFE sampler | — | — | 3 |
| Edge sampler | 1 | 4 | 1 |
| Error sampler | 4 | 16 | 4 |
| Total | 8 | 32 | 11 |

Table 2 compares the number of samplers according to two conventional structures and the proposed structure [2]. Too many samplers increase the load capacitance of a summer, which limits the maximum equalization frequency range and excessively increases power consumption. In PAM-4 signaling, while the speculative structure requires four times more samplers for all types compared to the direct structure, the proposed structure adds only the DFE sampler to obtain extended time constraint.

TABLE 4

| | Data rate | | | |
|---|---|---|---|---|
| | 7.5 Gb/s | | 22.5 Gb/s | |
| DFE Structure | Direct DFE | Proposed DFE | Direct DFE | Proposed DFE |
| Power consumption | 29.86 mW | 42.89 mW | 48.38 mW | 68 mW |

Table 4 shows the power consumption in each of the simulations above. As shown in Table 3, the proposed DFE may minimize the number of additional samplers, thus minimizing additional power consumption compared to the speculative DFE.

In general, DFE taps consist of NMOS taps [2][4]. In the NMOS-only tap, the stronger the current weight, the lower the common voltage of the signal. This feature causes several problems. First, too low a common voltage reduces the gain and adversely affects the linearity of the summer, which causes a harmful effect on the PAM4 signaling with three eyes at the same time. Second, the sampler should be designed by considering a low common voltage region. If the common voltage is too low, $T_{clk-q}$ may change, which may cause a change in the feedback delay. Finally, the NMOS-only tap causes a change in the threshold voltage of the PAM4 signal. The data level and threshold voltage determined based on the signal equalized by the output of the CTLE have different values due to the NMOS tap. To this end, the data level and threshold voltage should be re-established. These problems would require a wide operating range for the summer and DAC, which may result in a mismatch. Accordingly, in the present disclosure, it is possible to keep the common voltage of a signal constant regardless of weights through directional equalization using a low voltage differential signaling (LVDS) tap.

$$C_{k+1} = C_k + \Delta \text{ sign}[\varepsilon_k] \text{sign}[V_{k-1}] \quad (5)$$

Referring again to FIG. 4, a summer having an LVDS tap according to an embodiment of the present disclosure is shown. The current weight of the tap is controlled through the Sign-Sign Least Mean Square (SS-LMS) algorithm. In Eq. (5), C represents the tap weight, Δ represents the step size of weight, sign[$\varepsilon_k$] represents the output of an error sampler, and sign[$V_{k-1}$] represents the output of the DATA sampler. The output of the DATA sampler specifies sign[$\varepsilon_k$] among four error samplers. The ON/OFF of three taps is operated by the outputs of three DFE samplers, and the three taps have the same coefficient.

Figure 8:
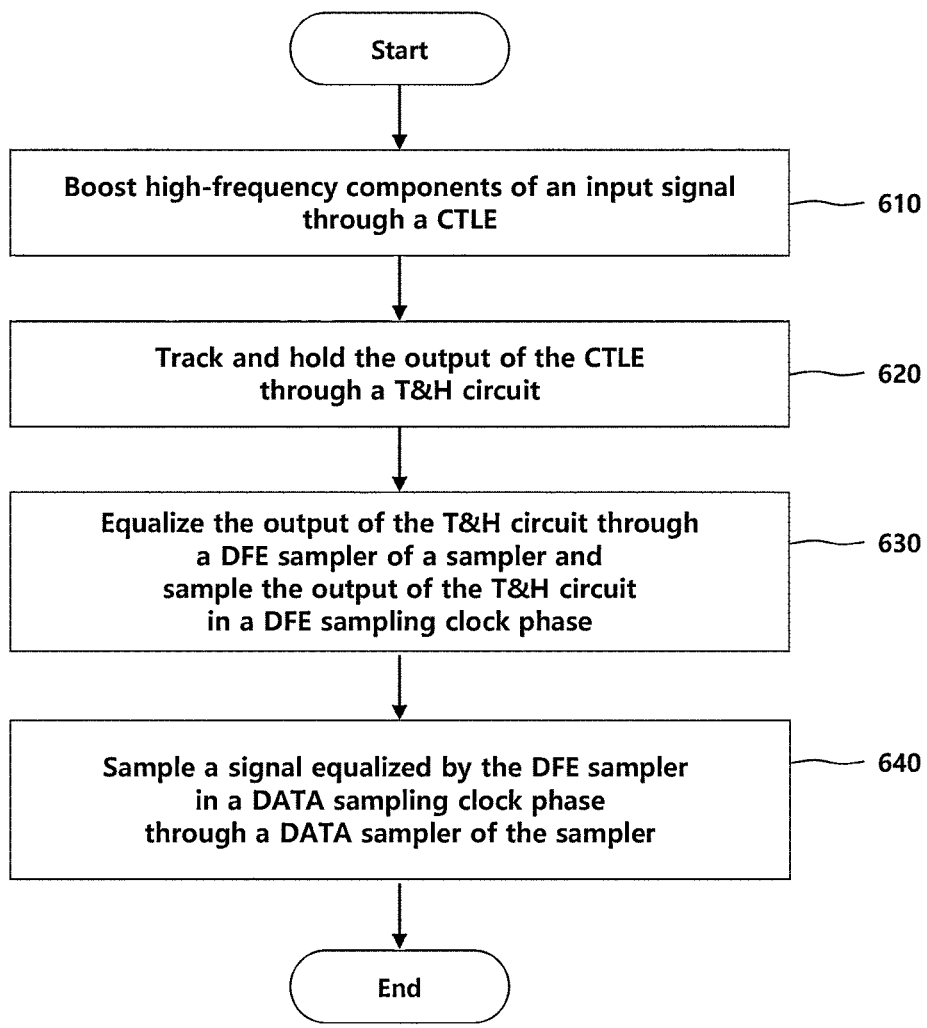
FIG. 8 is a flow diagram illustrating a method for operating an adaptive non-speculative DFE with an extended time constraint for a PAM-4 receiver according to one embodiment of the present disclosure.

FIG. 8 is a flow diagram illustrating a method for operating an adaptive non-speculative DFE with an extended time constraint for a PAM-4 receiver according to one embodiment of the present disclosure.

The proposed method for operating an adaptive non-speculative DFE with an extended time constraint for a PAM-4 receiver comprises boosting high-frequency components of an input signal through a Continuous-Time Linear Equalizer (CTLE) 610; tracking and holding the output of the CTLE through a Track & Hold (T&H) circuit 620; equalizing the output of the T&H circuit and sampling the output of the T&H circuit in a DFE sampling clock phase through a Decision Feedback Equalization (DFE) sampler of a sampler 630; and sampling a signal equalized by the DFE sampler in a DATA sampling clock phase through a DATA sampler of the sampler 640.

In the 610 step, high-frequency components of an input signal are boosted through the CTLE.

In the 620 step, the output of the CTLE is tracked and held through the Track and Hold (T&H) circuit.

The output of the CTLE needs to be tracked and held, and the embodiment of the present disclosure adopts a bootstrap structure of the Track and Hold (T&H) circuit [1][8]. The T&H circuit tracks the output of the CTLE for 2 UI on the falling edge of the clock and holds the output of the CTLE for 2 UI on the rising edge of the clock.

The summer between the T&H circuit and the sampler keeps the common voltage of a signal constant regardless of weights through directional equalization using a Low Voltage Differential Signaling (LVDS) tap.

The sampler according to the embodiment of the present disclosure includes a Decision Feedback Equalization (DFE) sampler and a DATA sampler (refer to FIG. 3).

In the 630 step, the output of the T&H circuit is equalized and is sampled in the DFE sampling clock phase through the Decision Feedback Equalization (DFE) sampler of the sampler.

In the 640 step, a signal equalized by the DFE sampler in the DATA sampling clock phase is sampled through the DATA sampler of the sampler. Here, the DFE sampling clock phase differs from the DATA sampling clock phase.

The output of the T&H circuit is equalized once again in the DFE sampling clock phase by the DFE sampler and then sampled by the DATA sampler in the DFE sampling clock phase different from the DFE sampling clock phase. In the direct DFE structure, only the output of the data sampler is used as a tap coefficient, and the output is encoded and used as recovered data. On the other hand, the roles of the DFE sampler and the DATA sampler in the proposed approach are different from the direct DFE structure as described below. The output of the DFE sampler that samples the output of the T&H circuit in the DFE sampling clock phase is encoded and used as a tap coefficient to equalize the output voltage of the summer to converge. Also, the output of the DATA sampler that samples the output of the T&H circuit in the DATA sampling clock phase is encoded and used as data, which increases the timing margin. Since the phase of the DFE sampling clock is different from the phase of the DATA sampling clock, the settling time of the DATA sampler may have a larger margin than the settling time of the DFE sampler. Also, when an error occurs in the output of the DFE sampler, the tap coefficient may be adjusted using the output of the DATA sampler having a larger margin for the settling time.

FIGS. 9 to 16 illustrate simulation results according to one embodiment of the present disclosure.

Figure 9:
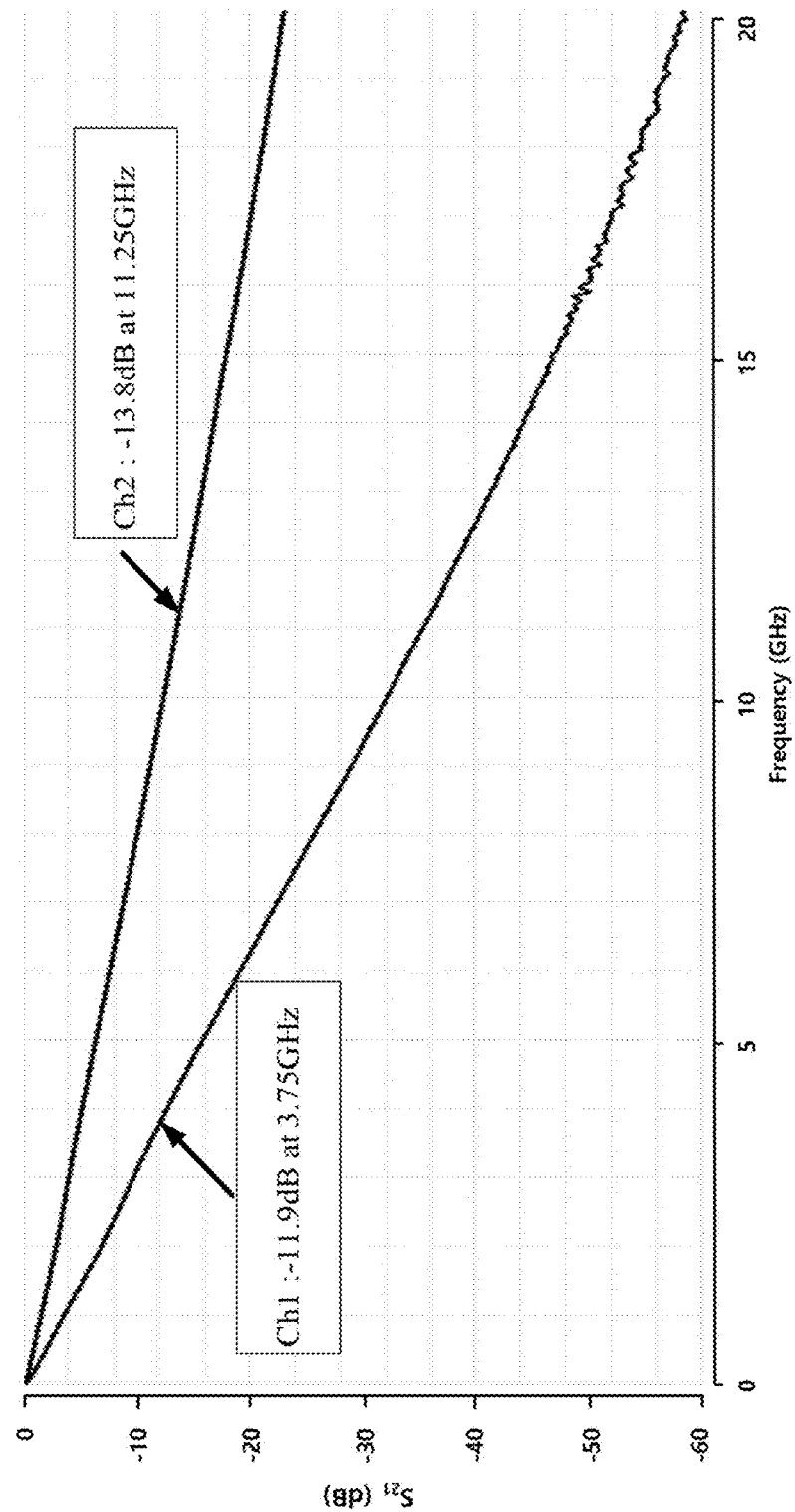
FIGS. 9 to 16 illustrate simulation results according to one embodiment of the present disclosure.
Figure 10:
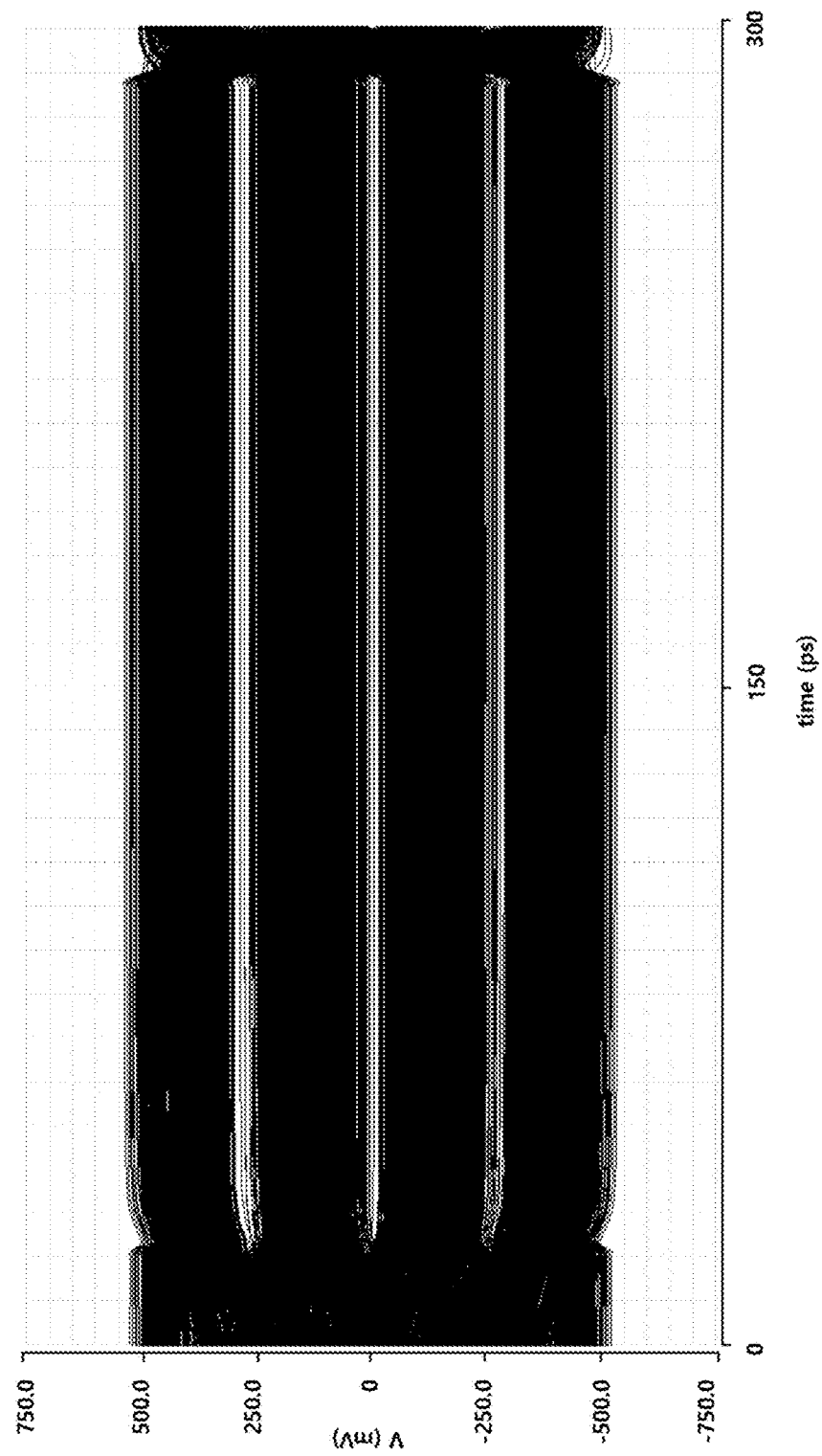
Figure 11:
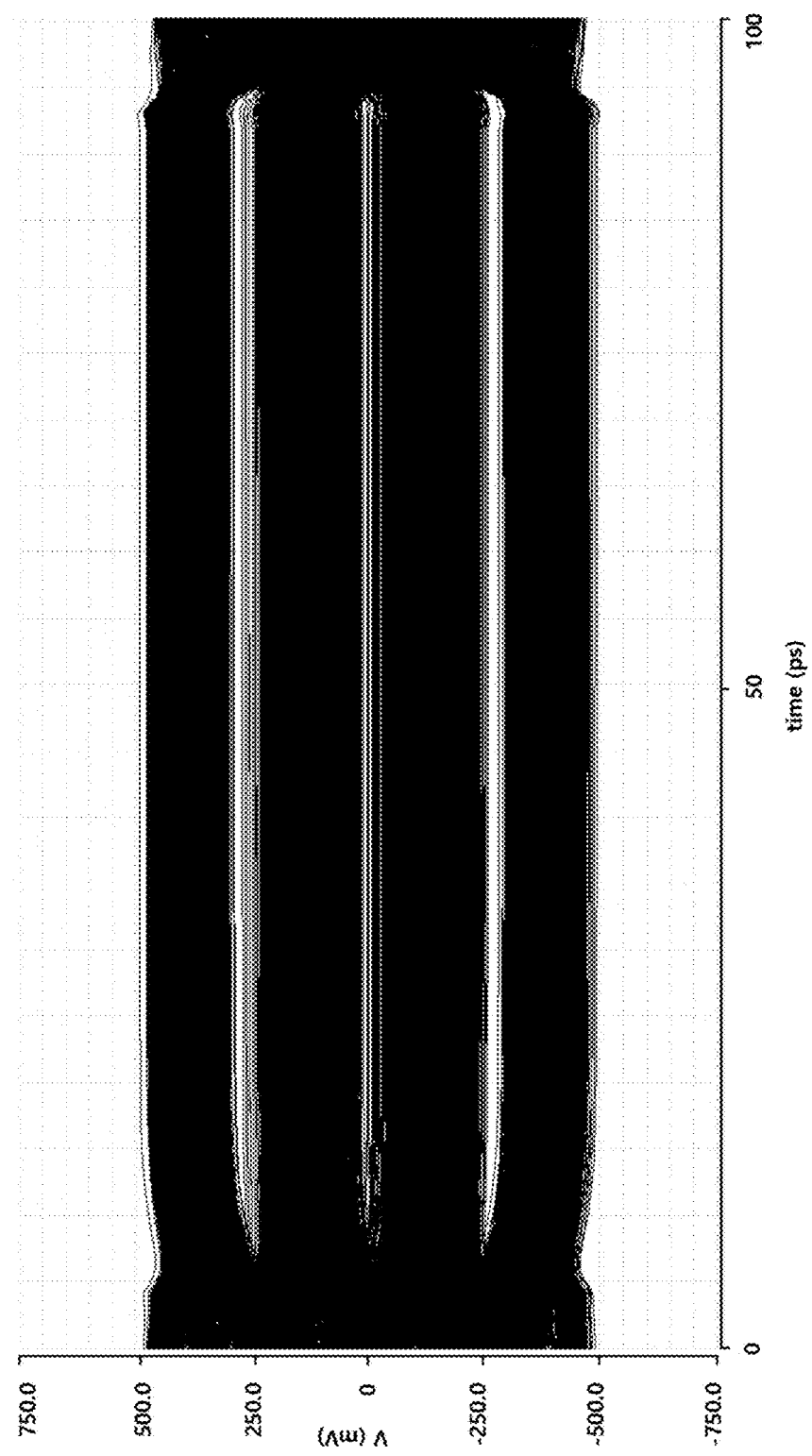
Figure 12:
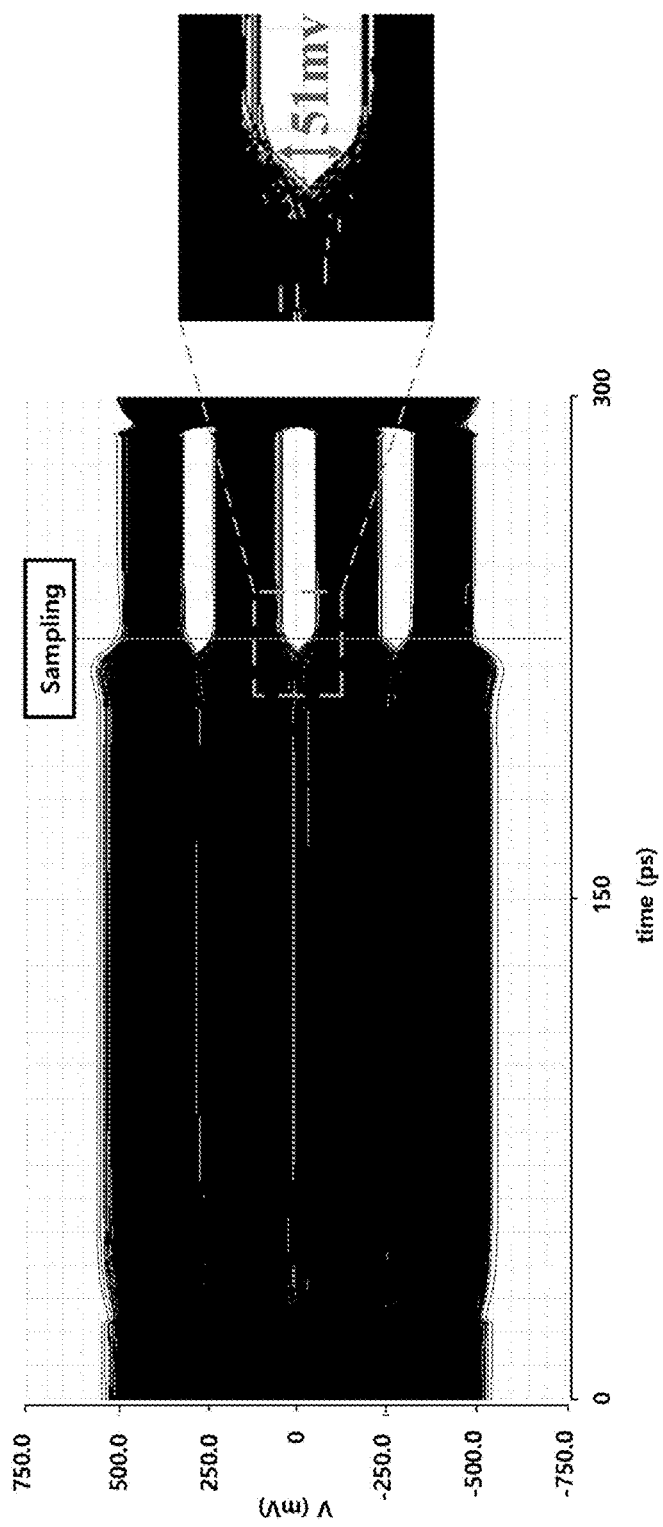
Figure 13:
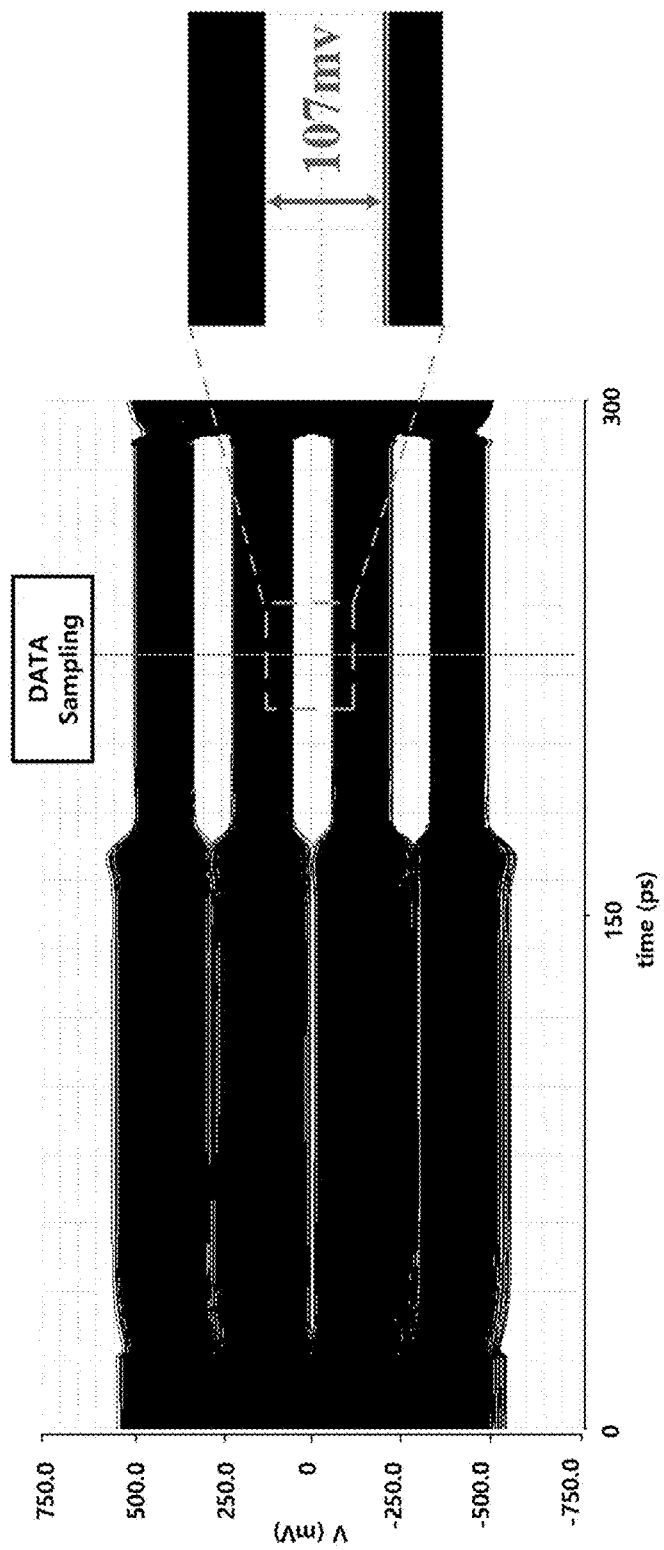
Figure 14:
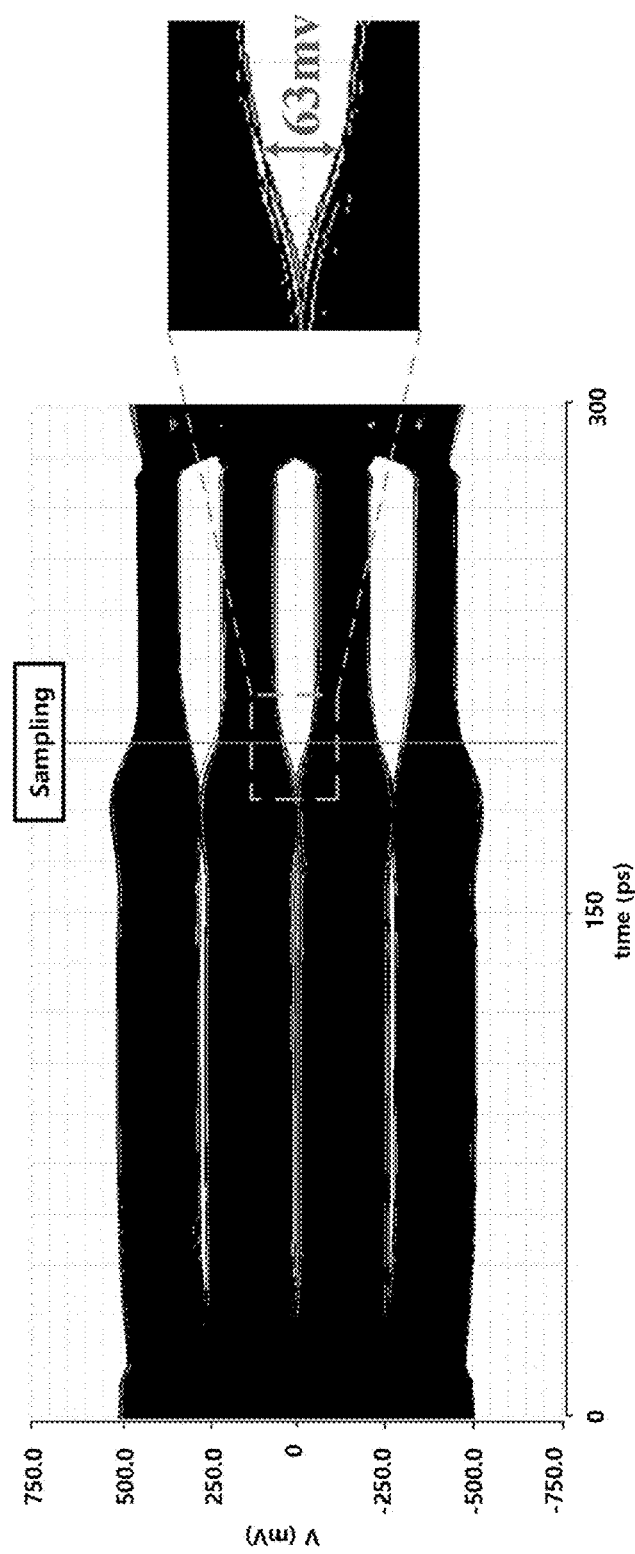
Figure 15:
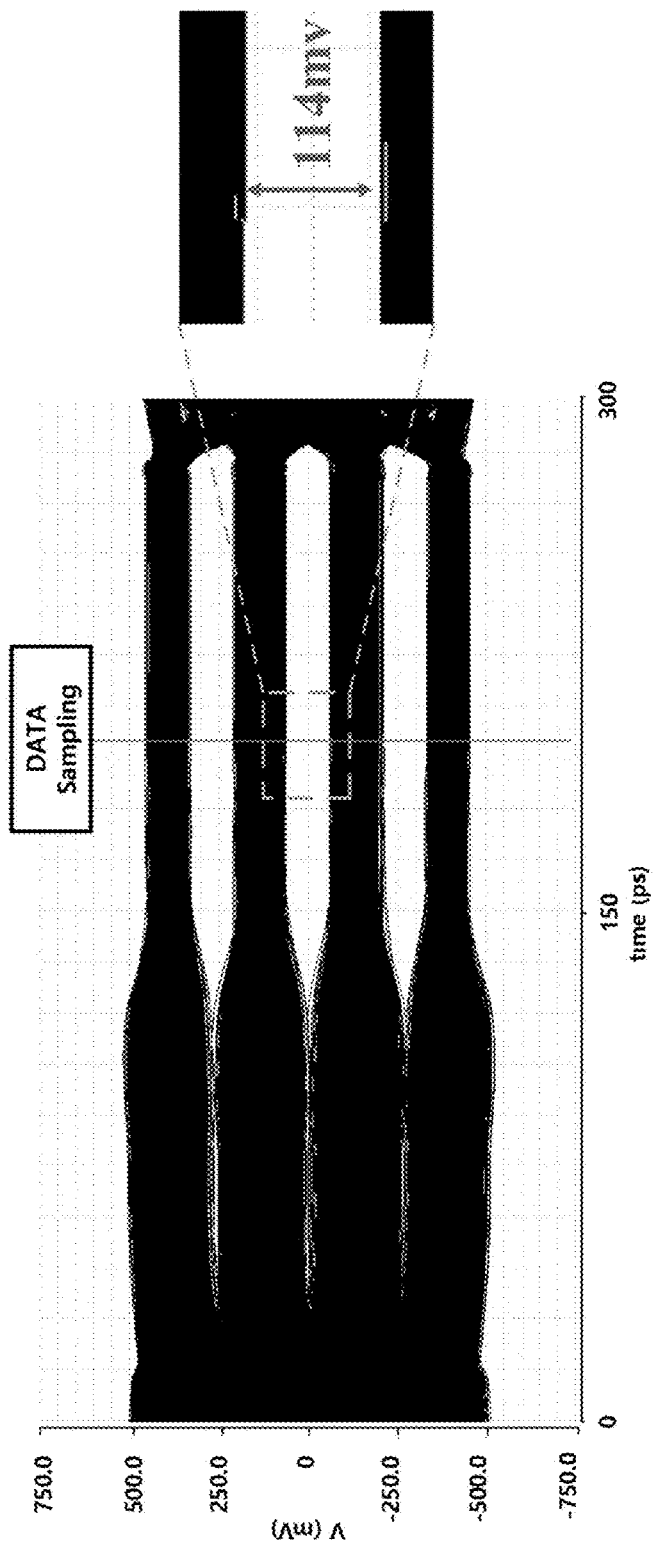
Figure 16:
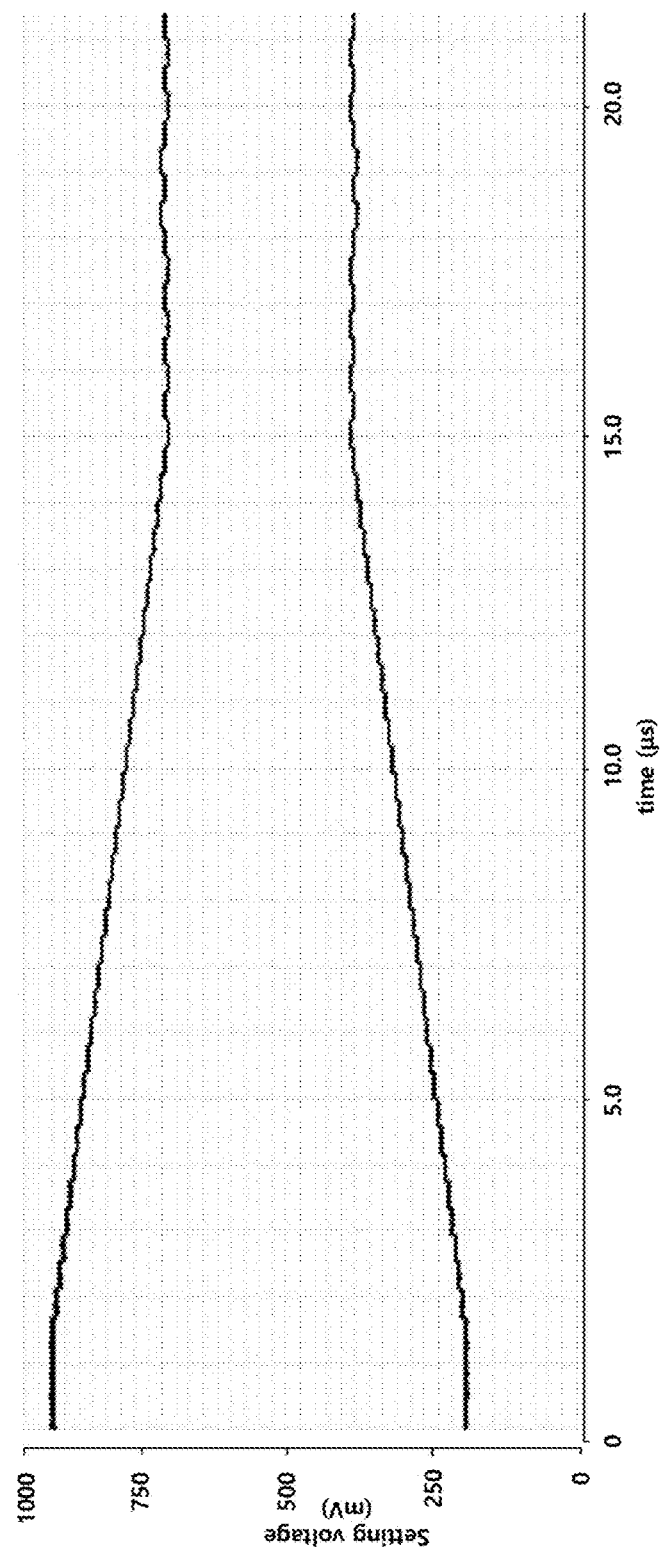

The circuit used for the simulation according to an embodiment of the present disclosure was designed using a 65 nm CMOS process and verified through the simulation. A PAM-4 PRBS pattern was used for input data, and FIG. 9 shows channel 1 (Ch1) with attenuation of 11.9 dB at 3.75 GHz and channel 2 (Ch2) with attenuation of 13.8 dB at 11.25 GHz. FIGS. 10 and 11 show eye diagrams before equalization due to a DFE. FIGS. 12 and 13 show eye diagrams with sampling point indication using a strong arm-type latch at 7.5 Gbps for the direct DFE and the proposed DFE, respectively. FIGS. 14 and 15 show eye diagrams with sampling point indication using a CML latch at 22.5 Gbps for the direct DFE and the proposed DFE, respectively. FIGS. 12 and 14 show that sampling is performed at a point with less stability. Therefore, the eye height is not enough. On the other hand, FIGS. 13 and 15 show that since DATA sampling is performed with a sufficient settling time, the eye height of the DATA sampler is larger than when the direct DFE is used. FIG. 16 shows that the current tap weight has been stabilized using the LVDS tap. Since the LVDS tap has to be activated without changing the common mode of a signal, the current through the NMOS tap and the PMOS tap should be the same. Therefore, the weights of the NMOS current source and the PMOS current source operate symmetrically considering the threshold voltage of MOSFET.

The present disclosure proposes a non-speculative DFE with a time constraint of 1.5 UI. The proposed DFE additionally requires only the DFE sampler and has a time constraint similar to that of the PAM-4 speculative DFE which requires four times more hardware components in the summer output node than the direct DFE. The time constraint improved through the proposed structure shows that the DFE implemented with the first tap may operate in a stable manner with a sufficient settling time at 7.5 Gbps and 22.5 Gbps, respectively.

Figure 17:
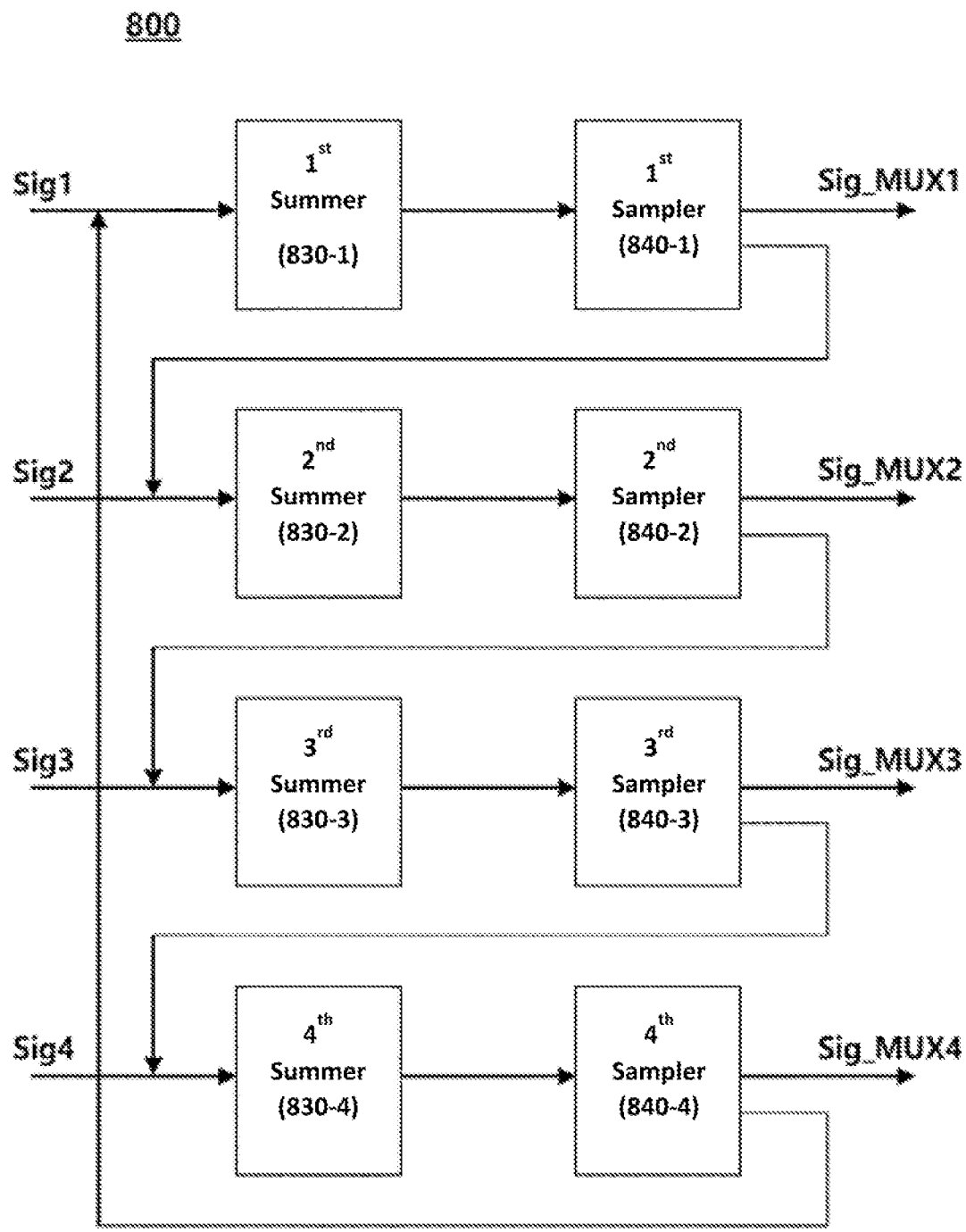
FIG. 17 illustrates a structure of a decision feedback equalizer according to one embodiment of the present disclosure.

FIG. 17 illustrates a structure of a decision feedback equalizer according to one embodiment of the present disclosure.

Referring to FIG. 17, the decision feedback equalizer 800 may include first to fourth summers 830-1 to 830-4 and first to fourth samplers 840-1 to 840-4.

The first to fourth summers 830-1 to 830-4 may receive first to fourth input signals Sig1 to Sig4 and perform directional equalization of the input signals. For example, the first to fourth summers 830-1 to 830-4 may be LVDS taps and may keep the common voltage of a signal constant regardless of weights.

Signals Sig1 to Sig4 transmitted to the first to fourth summers 830-1 to 830-4 may be the signals obtained by processing the quarter-rate PAM-4 signal transmitted from the transmitter Tx. For example, the signals may be those signals that have passed through the CTLE which selectively activates signals in the high-frequency region among the input signals. Also, the signals may be those signals that have passed through the Track and Hold (T&H) circuit which tracks and holds the output of the CTLE.

The first to fourth summers 830-1 to 830-4 may receive the output signal of the T&H circuit and utilize the summer as shown in FIG. 4 to obtain a convergence value using the tap coefficient.

Figure 18:
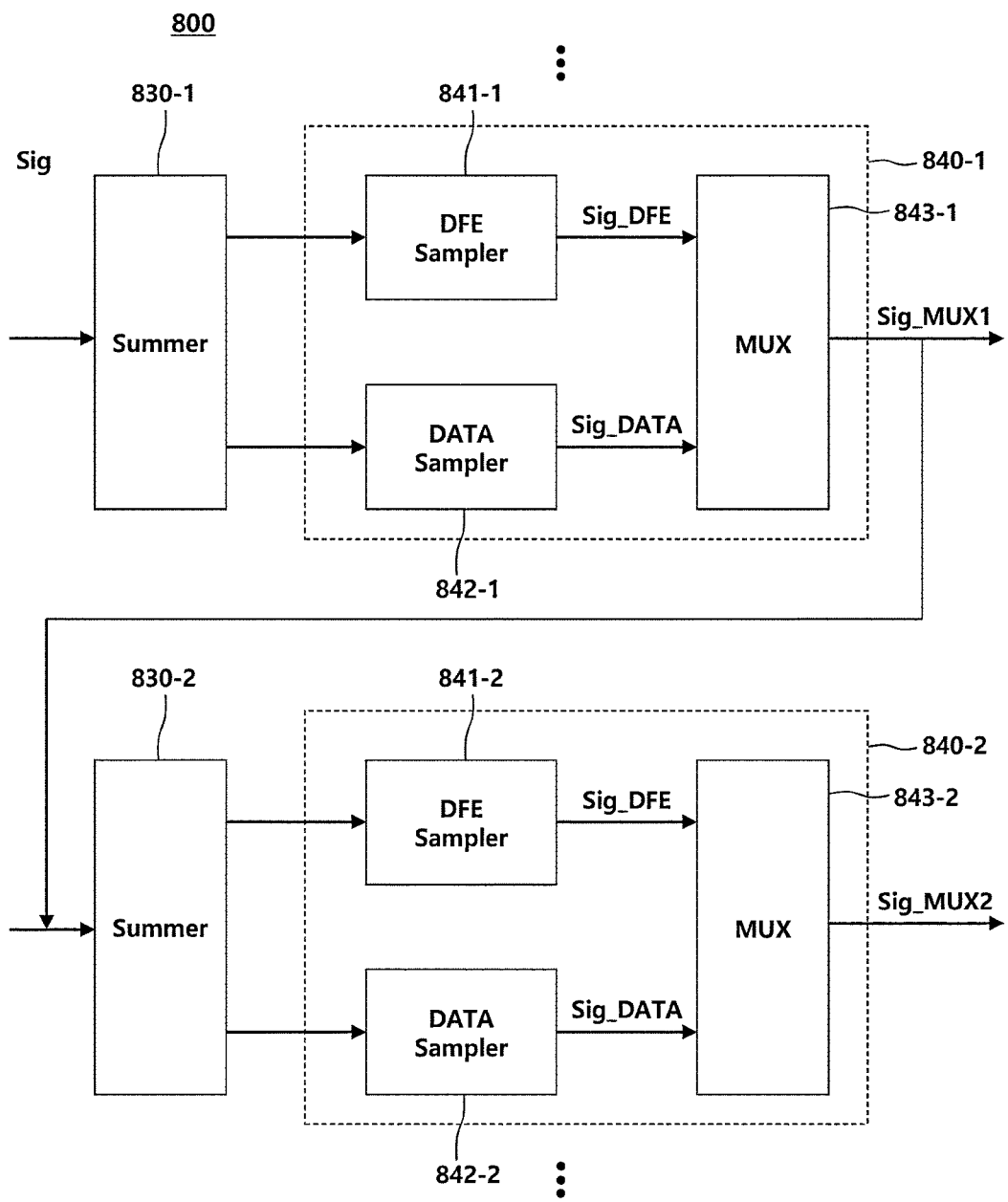
FIG. 18 is an enlarged view of a decision feedback equalizer according to one embodiment of the present disclosure.

FIG. 18 is an enlarged view of a decision feedback equalizer according to one embodiment of the present disclosure.

Referring to FIG. 18, the decision feedback equalizer 800 may include a first summer 830-1, a first DFE sampler 841-1, a first DATA sampler 842-1, and a first multiplexer 843-1.

The first summer 830-1 may add a first input signal Sig1 and output a summed signal and adjust a tap coefficient by receiving a fourth multiplexer output signal Sig_MUX4 from the fourth summer 830-4.

The first DFE sampler 841-1 may sample the output of the first summer 830-1 in a first DFE sampling clock phase.

The first DATA sampler 842-1 may sample the output of the first summer in a first DATA sampling clock phase.

The first DFE sampling clock phase that determines the operation timing of the first DFE sampler 841-1 may be different from the first DATA clock phase that determines the operation timing of the first DATA sampler 842-1. For example, the clock signal transmitted to the first DFE sampler 841-1 may be CLK0, and the clock signal transmitted to the first DATA sampler 842-1 may be CLK45.

The first multiplexer 843-1 may select one of the outputs of the first DFE sampler and the first DATA sampler and output the selected one. The signal Sig_MUX1 output from the first multiplexer 843-1 may be fed back to the second summer and may be utilized to update the tap coefficient for equalizing the output signal of the second summer to converge.

The clock signal transmitted to the first multiplexer 843-1 may be CLK90. Here, the timing difference between the rising edge or the falling edge of CLK45 and CLK90 may be defined as 0.5 UI, and the first multiplexer 843-1 may operate after 0.5 UI from the DATA clock phase. In other words, the operation timing of the first DFE sampler 841-1 and the operation timing 842-1 of the first DATA sampler have a time difference of 0.5 UI, and the operation timing of the first DATA sampler 842-1 and the operation timing of the first multiplexer 843-1 may be set in association with each other to have a time interval difference of 0.5 UI.

The first multiplexer 843-1 may select and output the output signal of the first DATA sampler 842-1 for a predetermined period. For example, the first multiplexer 843-1 may select and output the output signal of the first DATA sampler 842-1 during a period in which a high-level clock signal is received.

The first multiplexer 843-1 may recognize the rising edge of the transmitted clock signal-which may be defined as the first multiplexer clock-select and output the output signal of the first DATA sampler 842-1, recognize the falling edge, and select and output the output signal of the first DFE sampler 841-1. In this case, the output signal may be determined based on the clock timing without involving an external circuit for computational operation.

If necessary, the first multiplexer 843-1 may determine an output signal by receiving a control signal from a circuit having a computational capability such as an external computing device—for example, a microcontroller unit. In this case, the external computing device may determine a case where the output signals of the first DFE sampler 841-1 and the first DATA sampler 842-1 are different or a case where an error occurs in signal processing.

The first and second summers 830-1 and 830-2 may perform directional equalization using a low voltage differential signal (LVDS) tap.

Here, the second summer 830-2 may adjust the tap coefficient based on the output signal Sig_MUX1 of the first multiplexer.

The first multiplexer 843-1 may increase a timing margin by selecting and outputting a delayed input signal between the output signal of the first DFE sampler 841-1 and the output signal of the first DATA sampler 842-1. Changing the connection structure of a plurality of samplers having different clock timings instead of using one sampler makes it possible to effectively solve the time constraint problem occurring in the sampling process.

The decision feedback equalizer 800 may further include a second adder 830-2, a second DFE sampler 841-2, a second DATA sampler 842-2, and a second multiplexer 843-2.

The second summer 830-2 may add the second input signal Sig2 and the output signal Sig_MUX1 of the first multiplexer and output the summed signals.

The second DFE sampler 841-2 may sample the output of the second summer 830-2 in the second DFE sampling clock phase.

The second DATA sampler 842-2 may sample the output of the second summer 830-2 in the second DATA sampling clock phase.

The second multiplexer 843-2 may select and output the output signal of the second DFE sampler 841-2 or the output signal of the second DATA sampler 842-2.

The output signal of the second DFE sampler of the decision feedback equalizer 800 may have a connection relationship forming a sequential signal line fed back to the third summer 830-3, and the output signal of the second DATA sampler may be passed to the encoder.

The decision feedback equalizer 800 may include the first to fourth summer 830-1 to 830-4 receiving the quarter-rate PAM-4 signal as the first to the fourth input signal and performing directional equalization using LVDS taps; and the first to the fourth DFE sampler 841-1 to 841-4 and the first to the fourth DATA sampler 842-1 to 842-4 receiving and sampling the outputs of the first to the fourth summer and feeding back the sampled outputs, respectively.

Figure 19:
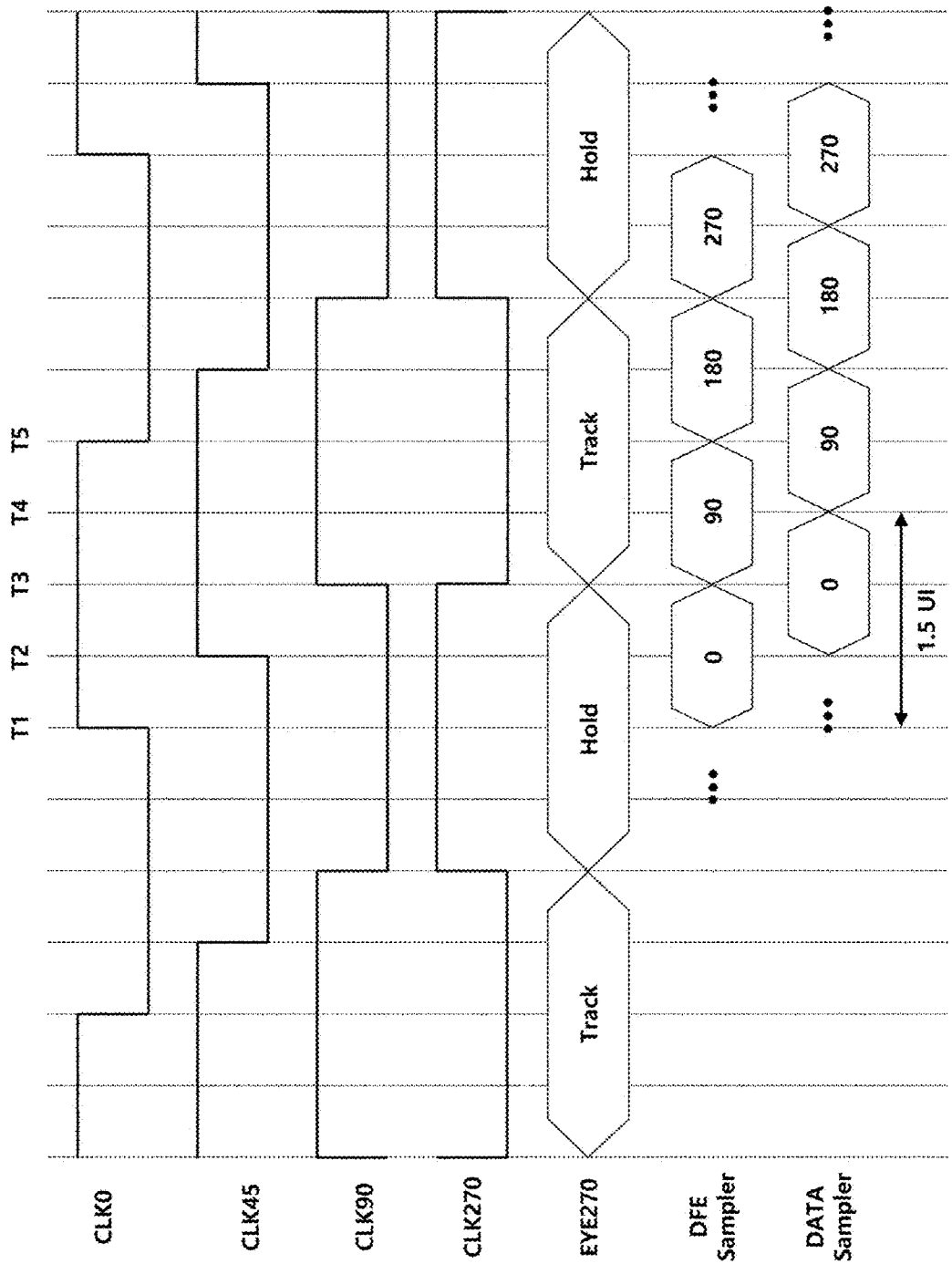
FIG. 19 illustrates a timing diagram of a sampler according to one embodiment of the present disclosure.

FIG. 19 illustrates a timing diagram of a sampler according to one embodiment of the present disclosure.

Referring to FIG. 19, the T&H circuit (not shown) may detect a falling edge of CLK270, track the input signal for a period of 2 UI in the low-level region, detect a rising edge of CLK270, and hold the input signal for a period of 2 UI in the high-level region. The T&H circuit (not shown) may pass the output signal to the summer or sampler.

The DFE sampler 841 may perform sampling for a period of 1 UI at the rising edge timing T1 of CLK0 and perform the operation above repeatedly.

The DATA sampler 842 may perform sampling for a period of 1 UI at the rising edge timing T2 of CLK45 and perform the operation above repeatedly.

The decision feedback equalizer 800 may have an operation period ranging from the sampling start point T1 of the DFE sampler 841 to the sampling end point T4 of the DATA sampler 842 and have a timing margin of 1.5 UI for this case.

The clock signals, CLK0, CLK45, and CLK90, may have a period of 0.5 UI defined as the timing of a rising edge or a falling edge, respectively.

Figure 20:
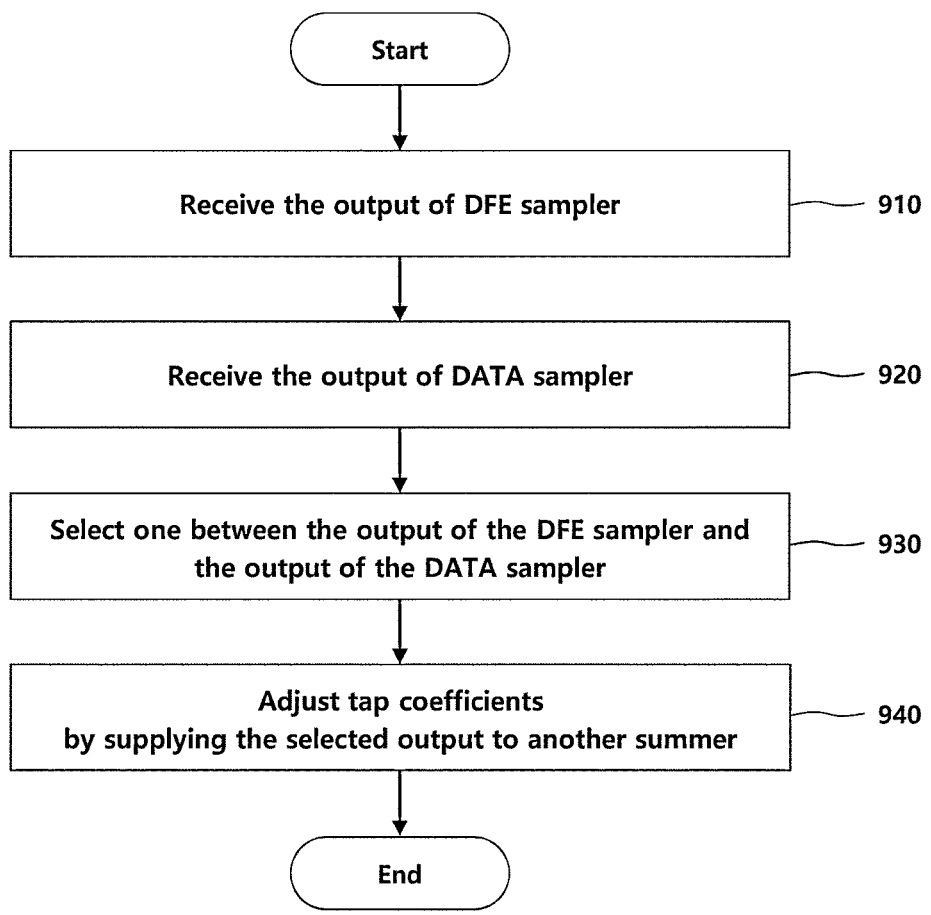
FIG. 20 is a flow diagram of a method for adjusting a tap coefficient of a summer according to one embodiment of the present disclosure.

FIG. 20 is a flow diagram of a method for adjusting a tap coefficient of a summer according to one embodiment of the present disclosure.

Referring to FIG. 20, a method for adjusting a tap coefficient of a summer may comprise receiving the output signal of a DFE sampler 910; receiving the output signal of a DATA sampler 920; selecting one between the output signal of the DFE sampler and the output signal of the DATA sampler 930; and adjusting the tap coefficient by supplying the selected output signal to another summer 940.

The receiving the output signal of the DFE sampler 910 may perform the sampling operation of the DFE sampler and transmit the output signal to a multiplexer.

The receiving the output signal of the DATA sampler 920 may perform the sampling operation of the DATA sampler and the output signal to the multiplexer. Here, the sampling operation timing of the DATA sampler may be different from the sampling operation timing of the DFE sampler, and the input signal and the output signal of each sampler may be transmitted and received by a separate signal line.

The selecting one between the output signal of the DFE sampler and the output signal of the DATA sampler 930 may receive a plurality of signals from the multiplexer and select and output one from among the received signals.

When the output signal of the DFE sampler has the same value as the output signal of the DATA sampler, the multiplexer may select and output an arbitrary signal between the two output signals.

When the output signal of the DFE sampler is different from the output signal of the DATA sampler, the multiplexer may select and output the output signal of the DATA sampler. When the DATA sampler has a sufficient timing margin than the DFE sampler, the accuracy of the DATA sampler's computation result may be based on statistics with a high probability. When a separate computing device is not involved and the output signal of the DATA sampler is trusted, the multiplexer may reduce the time for internal computation and the amount of memory storage. Depending on the needs, to increase the computational accuracy, a further step of comparing and verifying the sampling results of the DATA sampler and the DFE sampler through an external computing device may be performed.

In the case of a summer—for example, a summer using an LVDS tap—the adjusting the tap coefficient by supplying a selected output signal to another summer 940 may perform adjusting the tap coefficient based on the signal selected and output by the multiplexer. When the sampling result of the DATA sampler shows no difference from the sampling result of the DFE sampler, the step of adjusting the tap coefficient may not be performed. When the sampling result of the DATA sampler is different from the sampling result of the DFE sampler, the time for converging the output value of the summer may be reduced by adjusting the tap coefficient.

The device described above may be implemented as a hardware component, a software component, and/or a combination of the hardware and software components. For example, the device and the components described in the embodiments may be implemented using one or more general-purpose computers or special-purpose computers including, for example, a processor, a controller, an Arithmetic Logic Unit (ALU), a digital signal processor, a microcomputer, a Field Programmable Array (FPA), a Programmable Logic Unit (PLU), a microprocessor, or any other device capable of executing and responding to instructions. The processing device may execute an operating system (OS) and one or more software applications run on the operating system. Also, the processing device may access, store, manipulate, process, and generate data in response to the execution of the software. For the convenience of understanding, it is often assumed that one processing device is employed; however, it should be understood by those skilled in the art that the processing device may include a plurality of processing elements and/or a plurality of processing element types. For example, the processing device may include a plurality of processors or one processor and one controller. Other processing configurations are also possible, such as parallel processors.

Software may include a computer program, code, instructions, or a combination of one or more of the above; and may configure a processing device to operate in a desired manner or instruct the processing device independently or collectively. The software and/or data may be embodied in a particular type of machine, component, physical equipment, virtual equipment, computer storage medium, or device to be interpreted by the processing device or to provide instructions or data to the processing device. The software may be distributed over other computer systems connected to each other through a network to be stored or executed in a distributed manner. The software and data may be stored in one or more computer-readable recording media.

The methods according to the embodiments of the present disclosure may be implemented in the form of program commands which may be executed through various types of computer means and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks; and hardware devices specially designed to store and execute program commands such as a ROM, a RAM, and a flash memory. Examples of program commands include not only the machine code such as those generated by a compiler but also the high-level language code which may be executed by a computer through an interpreter and the like.

As described above, although the present disclosure has been described with reference to a limited number of embodiments and drawings, the present disclosure may be modified and changed in various ways from the descriptions above by those skilled in the art to which the present disclosure belongs. For example, an appropriate result may still be achieved even if the technical elements described above are executed in a different order from that of the method described above and/or the constituting elements such as the system, the structure, and the circuit described above are merged or combined in a form different from that described above or replaced or substituted by other constituting elements or equivalents.

Therefore, other implementations, other embodiments, and equivalents of the claims belong to the technical scope of the claims.

REFERENCES

[1] A. Roshan-Zamir, O. Elhadidy, H. Yang and S. Palermo, "A Reconfigurable 16/32 Gb/s Dual-Mode NRZ/PAM4 SerDes in 65-nm CMOS," Solid-State Circuits, IEEE Journal of, Vol. 52, No. 4, pp. 2430-2447, September, 2017

[2] J. Im et al., "A 40-to-56 Gb/s PAM-4 Receiver With Ten-Tap Direct Decision-Feedback Equalization in 16-nm FinFET," Solid-State Circuits, IEEE Journal of, VOL. 52, No. 12, pp. 3486-3502, December, 2017

[3] R. Payne et al., "A 6.25-Gb/s binary transceiver in 0.13-/spl mu/m CMOS for serial data transmission across high loss legacy backplane channels," Solid-State Circuits, IEEE Journal of, Vol. 40, No. 12, pp. 2646-2657, December, 2005

[4] A. Roshan-Zamir et al., "A 56-Gb/s PAM4 Receiver With Low-Overhead Techniques for Threshold and Edge-Based DFE FIR- and IIR-Tap Adaptation in 65-nm CMOS," Solid-State Circuits, IEEE Journal of, Vol. 54, No. 3, pp. 672-684, March, 2019

[5] M. Dolan and F. Yuan, "An adaptive edge decision feedback equalizer with 4PAM signaling," Circuit and Systems, 2017, MWSCAS 2017, 60th IEEE International Midwest Symposium on, pp. 535-538, MA., 2017.

[6] YUAN, Fei, et al., "Design techniques for decision feedback equalization of multi-giga-bit-per-second serial data links: a state-of-the-art review," Devices & Systems, 2014, IET Circuits, Vol. 8, pp. 118-130, 2014.

[7] K. Chen, W. Chen and S. Liu, "A 0.31-pJ/bit 20-Gb/s DFE With 1 Discrete Tap and 2 IIR Filters Feedback in 40-nm-LP CMOS," Circuits and Systems II: IEEE Transactions on, Vol. 64, No. 11, pp. 1282-1286, November, 2017.

[8] Y. Krupnik et al., "112-Gb/s PAM4 ADC-Based SERDES Receiver with Resonant AFE for Long-Reach Channels," Solid-State Circuits, IEEE Journal of, Vol. 55, No. 4, pp 1077-1085, April, 2020.

[9] Y. Li and F. Yuan, "Adaptive data-transition decision feedback equalizer for serial links," Circuit and Systems, 2017, MWSCAS 2017, 60th IEEE International Midwest Symposium on, pp. 1609-1612, MA., 2017.

[10] K.-C. Chen, W. W.-T. Kuo and A. Emami, "A 60-Gb/s PAM4 Wireline Receiver With 2-Tap Direct Decision Feedback Equalization Employing Track-and-Regenerate Slicers in 28-nm CMOS," Solid-State Circuits, IEEE Journal of, Vol. 56, No. 3, pp. 750-762, March, 2021.

[11] J. W. Jung and B. Razavi, "A 25 Gb/s 5.8 mW CMOS Equalizer," Solid-State Circuits, IEEE Journal of, Vol. 50, No. 2, pp. 515-526, February, 2015.

[12] J. LEE, P. Chiang, P. Peng, L. Chen and C. Weng, "Design of 56 Gb/s NRZ and PAM4 SerDes Transceivers in CMOS Technologies," Solid-State Circuits, IEEE Journal of, Vol. 50, No. 9, pp. 2061-2073, September, 2015.

What is claimed is:

1. A decision feedback equalizer, comprising:
a Continuous-Time Linear Equalizer (CTLE) configured to boost high-frequency components of an input signal;
a Track and Hold (T&H) circuit configured to track and hold an output of the CTLE; and
a sampler,
wherein the sampler comprises a
Decision Feedback Equalization (DFE) sampler configured to equalize an output of the T&H circuit and sample the output of the T&H circuit in a DFE sampling clock phase; and
a DATA sampler configured to sample a signal equalized by the DFE sampler in a DATA sampling clock phase,
wherein the DFE sampling clock phase differs from the DATA sampling clock phase.

2. The decision feedback equalizer of claim 1, wherein the T&H circuit tracks the output of the CTLE for 2 Unit Interval (UI) on a falling edge of a clock and holds the output of the CTLE for 2 UI in a rising edge of the clock.

3. The decision feedback equalizer of claim 1, wherein the output of the DFE sampler obtained by sampling the output of the T&H circuit in the DFE sampling clock phase is used as a tap coefficient for equalizing an output voltage of a summer to converge, and the output of the DATA sampler obtained by sampling the output of the T&H circuit in the DATA sampling clock phase is encoded and used as data to increase a timing margin.

4. The decision feedback equalizer of claim 3, wherein, since the DFE sampling clock phase is different from the DATA sampling clock phase, a settling time of the DATA sampler has a larger margin than a settling time of the DFE sampler and, when an error occurs in the output of the DFE sampler, the tap coefficient is adjusted by using the output of the DATA sampler of which the settling time has the larger margin.

5. The decision feedback equalizer of claim 1, further comprising a summer coupled between the T&H circuit and the sampler, wherein the summer keeps a common voltage of a signal constant regardless of a weight through directional equalization using a Low Voltage Differential Signaling (LVDS) tap.

6. A method for operating a decision feedback equalizer, the method comprising:
boosting high-frequency components of an input signal through a Continuous-Time Linear Equalizer (CTLE);
tracking and holding an output of the CTLE through a Track & Hold (T&H) circuit;
equalizing an output of the T&H circuit and sampling the output of the T&H circuit in a DFE sampling clock phase through a Decision Feedback Equalization (DFE) sampler of a sampler; and
sampling a signal equalized by the DFE sampler in a DATA sampling clock phase through a DATA sampler of the sampler, wherein the DFE sampling clock phase is different from the DATA sampling clock phase.

7. The method of claim 6, wherein, in equalizing the output of the T&H circuit and sampling the output of the T&H circuit in the DFE sampling clock phase through the DFE sampler of the sampler, an output of the DFE sampler obtained by sampling the output of the T&H circuit at the DFE sampling clock phase is used as a tap coefficient for equalizing an output voltage of a summer to converge.

8. The method of claim 6, wherein, in sampling the signal equalized by the DFE sampler in the DATA sampling clock phase through the DATA sampler of the sampler, an output of the DATA sampler obtained by sampling the output of the T&H circuit in the DATA sampling clock phase is encoded and the encoded output is used as data to increase a timing margin.

9. The method of claim 8, wherein, since the DFE sampling clock phase is different from the DATA sampling clock phase, a settling time of the DATA sampler has a larger margin than a settling time of the DFE sampler and, when an error occurs in the output of the DFE sampler, a tap coefficient is adjusted by using the output of the DATA sampler of which the settling time has the larger margin.

10. A decision feedback equalizer, comprising:
a first summer configured to add a first input signal and to output a summed signal;
a first DFE sampler configured to sample an output of the first summer in a first DFE sampling clock phase;
a first DATA sampler configured to sample the output of the first summer in a first DATA sampling clock phase; and
a first multiplexer configured to select and output one between an output of the first DFE sampler and an output of the first DATA sampler, wherein a signal output by the first multiplexer is fed back to a second summer,
wherein the first and second summers are configured to perform directional equalization by using a low voltage differential signal (LVDS) tap and the second summer is configured to adjust a tap coefficient based on an output signal of the first multiplexer.

11. The decision feedback equalizer of claim 10, wherein the first DFE sampling clock phase is different from the first DATA clock phase and the first multiplexer operates with a 0.5 UI delay from the DATA clock phase.

12. The decision feedback equalizer of claim 10, wherein the first multiplexer selects and outputs output signals of the first DATA sampler for a predetermined period.

13. The decision feedback equalizer of claim 10, wherein the first multiplexer recognizes a rising edge of a clock of the first multiplexer and selects and outputs an output signal of the first DATA sampler, and recognizes a falling edge and selects and outputs an output signal of the first DFE sampler.

14. The decision feedback equalizer of claim 10, wherein the first multiplexer increases a timing margin by selecting and outputting a delayed input signal between an output signal of the first DFE sampler and an output signal of the first DATA sampler.

15. The decision feedback equalizer of claim 10, wherein the decision feedback equalizer further comprises a CTLE configured to selectively activate signals in the high-frequency region among input signals; and a Track and Hold (T&H) circuit configured to track and hold an output of the CTLE and the first summer receives an output of the T&H circuit and keeps a common voltage constant.

16. The decision feedback equalizer of claim 10, wherein an operation timing of the first DFE sampler and an operation timing of the first DATA sampler have a time difference of 0.5 UI; and the operation timing of the first DATA sampler and an operation timing of the first multiplexer have a time difference of 0.5 UI.

17. The decision feedback equalizer of claim 10, further comprising:

the second summer configured to add a second input signal and an output signal of the first multiplexer and to output summed signals;

a second DFE sampler configured to sample an output of the second summer in a second DFE sampling clock phase;

a second DATA sampler configured to sample the output of the second summer in a second DATA sampling clock phase; and a second multiplexer configured to select and output an output signal of the second DFE sampler or an output signal of the DATA sampler.

18. The decision feedback equalizer of claim 17, wherein the output signal of the second DFE sampler is fed back to a third summer and the output signal of the second DATA sampler is transferred to an encoder.

19. The decision feedback equalizer of claim 10, further comprising second to fourth summers, included the first summer to receive quarter-rate PAM-4 signals as first to fourth input signals and to perform directional equalization by using LVDS taps; and second to fourth DFE samplers, included the first DFE sampler and second to fourth DATA samplers, included the first DATA sampler to receive and sample outputs of the first to fourth summers and to feedback sampled outputs, respectively.

* * * * *